(12) United States Patent
Fujino

(10) Patent No.: US 8,509,547 B2
(45) Date of Patent: Aug. 13, 2013

(54) SCAN CONVERSION APPARATUS, IMAGE ENCODING APPARATUS, AND CONTROL METHOD THEREFOR

(75) Inventor: Reiko Fujino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 13/203,719

(22) PCT Filed: Apr. 13, 2010

(86) PCT No.: PCT/JP2010/056890
§ 371 (c)(1),
(2), (4) Date: Aug. 26, 2011

(87) PCT Pub. No.: WO2010/131546
PCT Pub. Date: Nov. 18, 2010

(65) Prior Publication Data
US 2012/0177298 A1    Jul. 12, 2012

(30) Foreign Application Priority Data
May 14, 2009 (JP) ................................. 2009-118045

(51) Int. Cl.
G06K 9/36 (2006.01)
G06K 9/46 (2006.01)

(52) U.S. Cl.
USPC .......................................... 382/232; 382/248

(58) Field of Classification Search
USPC ............ 382/232, 240, 248, 250; 375/240.19, 375/240.2, 240.24
See application file for complete search history.

(56) References Cited

U.S. PATENT DOCUMENTS

| | | | |
|---|---|---|---|
| 5,714,950 A * | 2/1998 | Jeong et al. | 341/67 |
| 6,426,975 B1 | 7/2002 | Nishi et al. | 375/240.13 |
| 6,961,474 B1 | 11/2005 | Hirano et al. | 382/246 |
| 7,315,686 B2 | 1/2008 | Sakamoto | 386/235 |
| 7,382,925 B2 | 6/2008 | Boliek et al. | 382/233 |
| 7,593,961 B2 | 9/2009 | Eguchi et al. | 707/104.1 |
| 7,852,515 B2 | 12/2010 | Eschbach et al. | 358/3.28 |

(Continued)

FOREIGN PATENT DOCUMENTS

| | | |
|---|---|---|
| JP | 4-504040 | 7/1992 |
| JP | 7-50836 | 2/1995 |

(Continued)

OTHER PUBLICATIONS

International Search Report dated Jun. 22, 2010, in counterpart International Application No. PCT/JP2010/056890.

*Primary Examiner* — Phuoc Tran
(74) *Attorney, Agent, or Firm* — Fitzpatrick, Cella, Harper & Scinto

(57) ABSTRACT

This invention enables parallelly sorting data in substantially M blocks though statistical information is updated. In the first scan conversion, (15) input transform coefficients of a two-dimensional array are read out and output in accordance with scan order information ScanOrder[ ], thereby outputting sorted one-dimensional array data. At this time, a significant coefficient detection unit determines whether the sorted data is a significant coefficient. Upon receiving a notification that the sorted data is a significant coefficient, a statistical information update unit updates statistical information ScanTotals [x] at a corresponding position. When the relationship between statistical information ScanTotals[x] and immediately preceding statistical information ScanTotals[x−1] is an ascending order, ScanOrder[x−1] and ScanOrder[x], and ScanTotals[x−1] and ScanTotals[x] are swapped respectively. A second scan conversion unit starts scan conversion of transform coefficients with a delay of at least two transform coefficients from a first scan conversion unit.

10 Claims, 15 Drawing Sheets

(56) References Cited

U.S. PATENT DOCUMENTS

| | | | |
|---|---|---|---|
| 7,904,187 B2 | 3/2011 | Hoffberg et al. | 700/83 |
| 2003/0128753 A1* | 7/2003 | Lee et al. | 375/240.2 |
| 2003/0185439 A1* | 10/2003 | Malvar | 382/166 |
| 2004/0234141 A1 | 11/2004 | Christopoulos et al. | 382/233 |
| 2005/0100228 A1 | 5/2005 | Kitamura | 382/232 |
| 2006/0146936 A1 | 7/2006 | Srinivasan | 375/240.18 |
| 2011/0025799 A1 | 2/2011 | Rosati et al. | 347/104 |
| 2011/0255798 A1 | 10/2011 | Fujino et al. | 382/248 |

FOREIGN PATENT DOCUMENTS

| | | |
|---|---|---|
| JP | 11-252338 | 9/1999 |
| JP | 2001-517905 | 10/2001 |
| JP | 2004-32788 | 1/2004 |
| JP | 2005-160021 | 6/2005 |
| JP | 2006-191628 | 7/2006 |
| JP | 2007-129612 | 5/2007 |
| WO | 91/11074 | 7/1991 |

* cited by examiner

FIG. 3A

| / | 1 | 5 | 6 |
|---|---|---|---|
| 2 | 4 | 7 | 12 |
| 3 | 8 | 11 | 13 |
| 9 | 10 | 14 | 15 |

FIG. 3B

| / | 2 | 5 | 9 |
|---|---|---|---|
| 1 | 3 | 7 | 12 |
| 4 | 6 | 10 | 14 |
| 8 | 11 | 13 | 15 |

FIG. 3C

| / | 1 | 2 | 5 |
|---|---|---|---|
| 4 | 3 | 6 | 9 |
| 8 | 7 | 13 | 14 |
| 10 | 12 | 15 | 11 |

FIG. 3D

| / | 1 | 2 | 3 |
|---|---|---|---|
| 4 | 5 | 6 | 7 |
| 8 | 9 | 10 | 11 |
| 12 | 13 | 14 | 15 |

FIG. 3E

| / | 4 | 8 | 12 |
|---|---|---|---|
| 1 | 5 | 9 | 13 |
| 2 | 6 | 10 | 14 |
| 3 | 7 | 11 | 15 |

FIG. 7A

| SCAN ORDER : n | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| STATISTICAL INFORMATION :ScanTotals[] | 32 | 30 | 28 | 26 | 24 | 22 | 20 | 18 | 16 | 14 | 12 | 10 | 8 | 6 | 4 |

FIG. 7B

| SCAN ORDER : n | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| STATISTICAL INFORMATION :ScanOrder [] | d | a | e | h | b | i | f | l | e | j | m | g | n | k | o |

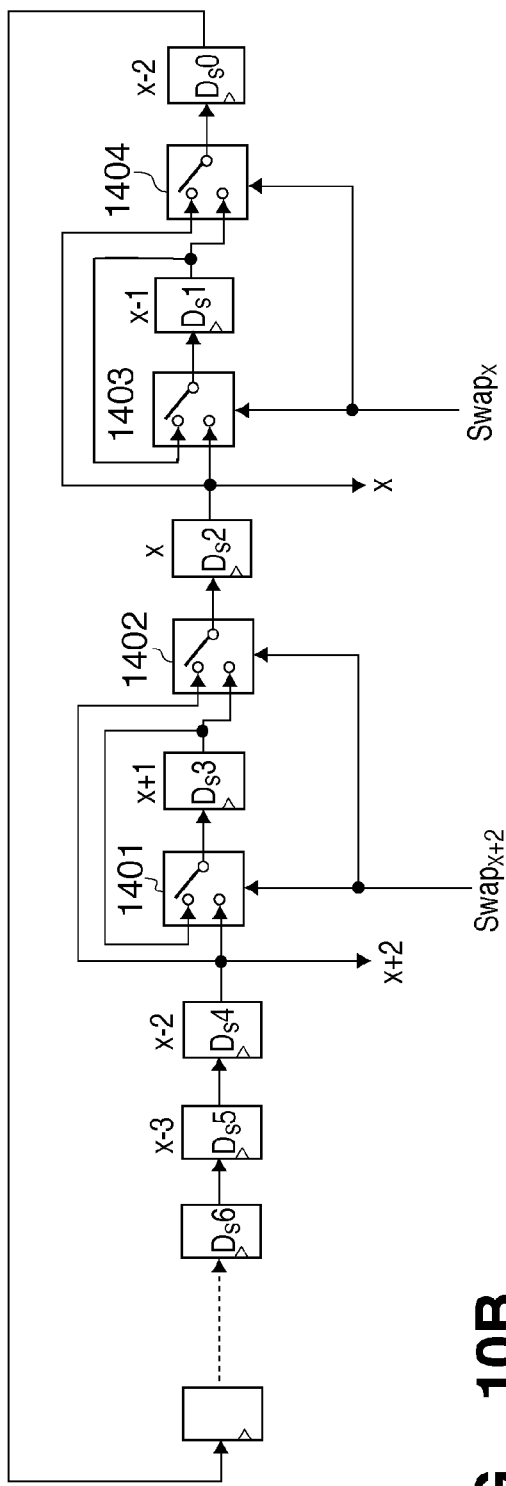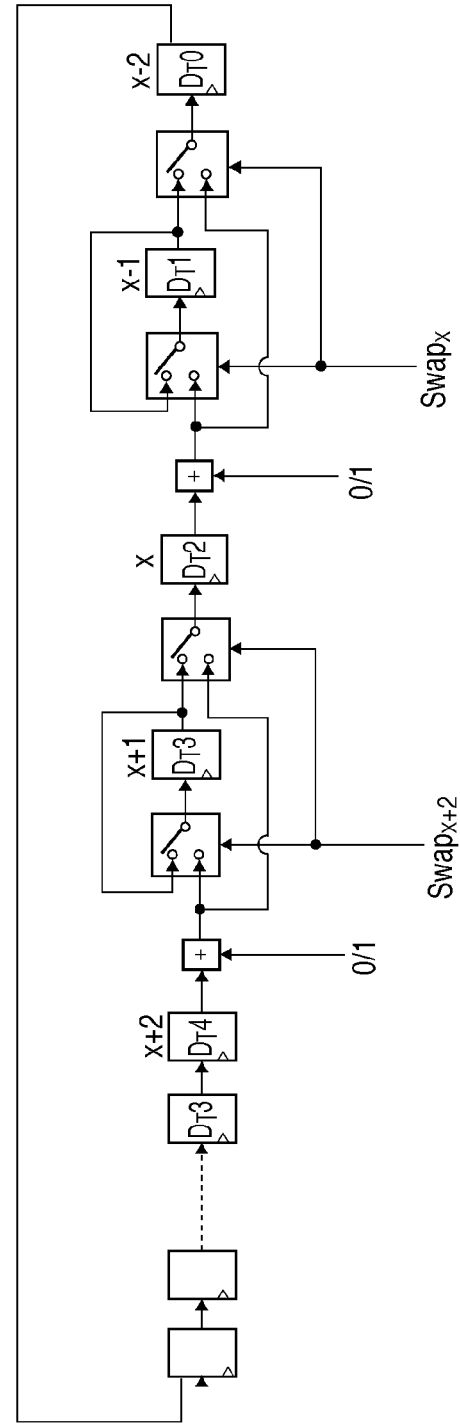
F I G. 10A
F I G. 10B

F I G. 15

| S1 | S2 | CMP1 | CMP2 | Swap$_{x-2}$ | Swap$_{x-1}$ | Swap$_x$ |
|---|---|---|---|---|---|---|
| 1 | 1 | 1 | !0 | 0 | 2 | 2 |
| 1 | 1 | 2 | !0 | 0 | 2 | 2 |
| 1 | 1 | 2 | 0 | 1 | 0 | 2 |
| 0 | 1 | !0 | don't care | 1 | 0 | 2 |
| 1 | 0 | !0 | don't care | 1 | 0 | 2 |
| other case | | | | 1 | 1 | 0 |

SCAN CONVERSION APPARATUS, IMAGE ENCODING APPARATUS, AND CONTROL METHOD THEREFOR

TECHNICAL FIELD

The present invention relates to a scan conversion apparatus, image encoding apparatus, and control method therefore.

BACKGROUND ART

Image data is generally formed from many pixels. The amount of image data is very large because one pixel has a plurality of color components and one color component is expressed by multiple bits. To save such data or transfer it in a short time, a compression encoding technique is indispensable. Procedures to encode digital image data obtained by an image sensing device or the like will be explained. First, image data is divided into tiles each having a desired rectangular size. Each tile is divided into a plurality of MBs (Macro Blocks) in a predetermined two-dimensional array. The MB serves as the processing unit of encoding processing (see FIG. 5).

The MB data is orthogonally transformed from color space data into transform coefficients in the frequency space. In lossy encoding, the transform coefficients are quantized to further increase the compression efficiency. When the image data pattern lies across a plurality of blocks, coefficient prediction is done for the quantized transform coefficients in accordance with respective frequency bands, further decreasing the level of the transform coefficients. When the quantization value changes depending on the coefficient position in the block or changes between blocks, an image data pattern lying across a plurality of blocks does not always hold a correlation corresponding to the frequency band of the transform coefficient. For this reason, coefficient prediction cannot always suppress the level of the transform coefficient. In this case, coefficient prediction processing may be omitted. The quantized transform coefficients having undergone the coefficient prediction are scanned as two-dimensional data and sorted into one-dimensional data so that significant coefficients (significant data) are positioned first and then insignificant coefficients (insignificant data), i.e., a run (zeros) continues after the significant coefficients. The sorted one-dimensional data are entropy-encoded, generating an encoded stream. By decoding the generated encoded stream, the image can also be reconstructed.

General image encoding apparatuses, which encode each pixel block, as represented by JPEG, MPEG2, MPEG4, and JPEG XR, adopt run-length encoding as entropy encoding. In run-length encoding, the length of a run is encoded. When encoding an image, transform coefficients in a two-dimensional array after frequency conversion or subsequent quantization are converted into a one-dimensional array. The one-dimensional array undergoes run-length encoding. As conversion (scan conversion) from a two-dimensional array into a one-dimensional array becomes more proper, the encoding efficiency becomes higher. A typical example of frequency transformation is DCT. One DC coefficient value is obtained at the upper left corner among 8×8 transform coefficients in a two-dimensional array attained by DCT transform. The 63 remaining transform coefficients are AC coefficients, and component values having higher frequencies are arranged in the order from the upper left to lower right. A scan order considered to be effective for scanning transform coefficients of a two-dimensional array into a one-dimensional array is zigzag scanning shown in FIG. 3A (numbers in squares shown in FIG. 3A indicate turns of scanning, and the name "zigzag scanning" is taken from the zigzag locus of turns indicated by the numbers).

However, a predetermined scan pattern, like a "zigzag" pattern, does not always contribute to the encoding efficiency because of the following three reasons.

First, when conversion is executed across blocks to suppress a block distortion, the edge is emphasized, increasing the variance of transform coefficients and also increasing the level of the transform coefficients. In this case, the level of a lower right transform coefficient in the two-dimensional array does not always become low. Hence, the scan order in which transform coefficients are scanned from the upper left corner to lower right corner of a block is not always optimum. Second, if pixels in a block have a horizontal or vertical dependence, the frequency bands of transform coefficients tend to be biased in accordance with the dependence. In this case, scan orders which differ between the horizontal and vertical directions, as shown in FIGS. 3B and 3C, are suitable. Finally, when a texture lies across blocks, the biases of transform coefficients in the blocks tend to be the same. In this case, the level of the coefficients can be suppressed by performing coefficient prediction for quantized transform coefficients. The bias of the frequency bands of transform coefficients changes depending on the prediction method, so a scan pattern corresponding to a prediction method is required. For these reasons, it is desirable to adaptively select a scan order optimum for an input image and encoding method (see, e.g., Japanese Patent Laid-Open No. 2004-032788 (to be referred to as reference 3)).

Further, a method of changing the scan order for each block is suited to an encoding method in which an MB is subdivided into blocks and the quantization value and coefficient prediction method can be changed for each block, as typified by JPEG XR (see, e.g., Japanese Patent Laid-Open No. 2006-191628 (to be referred to as reference 1) and Japanese Patent Laid-Open No. 7-050836 (to be referred to as reference 2)). For example, according to the scan order determination method described in reference 1, an MB made up of 16×16 pixels is divided into blocks A to P each having a size of 4×4 pixels, as shown in FIG. 4. In scan conversion processing, the transform coefficients of the respective blocks are read in the order of blocks A to P, and scan conversion is performed. For example, after all the transform coefficients of block A are input, they are sorted in a predetermined scan order to output the transform coefficients. The scan conversion results of block A are analyzed, i.e., the transform coefficients are analyzed in the scan order after sorting. Then, the scan order of the next block B is determined. In this way, the scan order of a block to undergo scan conversion is determined causally based on a block having undergone scan conversion before the target block.

A detailed example of the scan order determination method will be described with reference to the flowchart of FIG. 6. Assume that a two-dimensional array to be converted has 4×4 transform coefficients.

Statistical information ScanTotals (e.g., FIG. 7A) is prepared by statistically obtaining the position of one of 4×4 transform coefficients where a significant coefficient tends to be generated. Assume that $\{t^*N, t^*(N-1), t^*(N-2), \ldots, t\}$ is set as the initial value of the statistical information ScanTotals. In general, a small integer (2 or 4) is selected as t. The t value may be determined based on a quantization parameter used in quantization. The maximum bit length of each element of statistical information can be fixed by resetting the statistical information after a predetermined period. Scan order information ScanOrder[ ] is also prepared, which indicates an order in which a significant coefficient tends to be generated statistically (FIG. 7B). In FIG. 7B, a lower-case alphabetic letter corresponds to the position of a lower-case alphabetic letter in a block shown in FIG. 4. FIGS. 7A and 7B reveal that a significant coefficient is statistically highly likely to be generated at a transform coefficient position "d". That is, in FIGS. 7A and 7B, the first coefficient converted into a one-dimensional array is one at the position "d".

Note that the image encoding side and image decoding side suffice to take a common scan order, and numerical values in FIGS. 7A and 7B are merely an example. For example, in an application to an encoding apparatus which is premised on horizontal coefficient prediction, a scan order table exhibiting a scan order which gives priority to horizontal scanning is prepared (see FIG. 3B). Also, in an application to an encoding apparatus which is premised on vertical coefficient prediction, a scan order table which gives priority to vertical scanning is prepared (see FIG. 3C).

In S801, one transform coefficient C[x] ($0 \leq x \leq 15$) in a block having undergone scan conversion is acquired in the one-dimensional order (x=0 in the initial state). In S802, it is determined whether the transform coefficient C[x] acquired in S801 is a run (zeros). If the transform coefficient C[x] is a run, the process advances to determination in S806. If the transform coefficient C[x] is a significant coefficient (non-zero), processing in S803 is executed. If the process shifts to S803, statistical information ScanTotals[x] of the transform coefficient C[x] determined to be a significant coefficient is incremented. In S804, the magnitude relationship between pieces of statistical information ScanTotals[x] and ScanTotals[x−1] is determined. If ScanTotals[x] is larger than ScanTotals[x−1], this means that the significant coefficient generation count is higher at the position of the transform coefficient C[x] than at that of the transform coefficient C[x−1]. In S805, therefore, swapping processing is done for a coefficient position ScanOrder and ScanTotals corresponding to the scan order. In S803, if the statistical information ScanTotals[x] is smaller than ScanTotals[x−1], no scan order change processing is executed.

Detailed swapping processing in S805 will be explained. In the swapping processing, for example, the following calculation is done to swap the coefficient positions ScanOrder[x] and ScanOrder[x−1]:

Temp=ScanOrder[x−1]
ScanOrder[x−1]=ScanOrder[x]
ScanOrder[x]=Temp

On the other hand, for example, the following calculation is executed to swap the pieces of statistical information ScanTotals[x] and ScanTotals[x−1]:

Temp=ScanTotals[x−1]
ScanTotals[x−1]=ScanTotals[x]
ScanTotals[x]=Temp

If acquisition of transform coefficients in the block has not been completed in S806, the process advances to S807 to prepare for acquisition of the next coefficient in order to determine the scan order of the next block. If acquisition of all coefficients in the block has been completed, the scan order determination sequence ends.

As described above, the coefficient position ScanOrder[x−1] corresponding to the scan order x−1 is determined causally using pieces of statistical information ScanTotals[x] and ScanTotals[x−1] corresponding to the scan orders x and x−1. By repeating scan conversion, the scan order can be substantially optimized stepwise. Since the scan order can be determined causally, information explicitly notifying a decoding apparatus of the scan order need not be added to an encoded stream.

However, according to the conventional scan order determination method, blocks to undergo scan conversion need to be processed sequentially, and the scan order can be determined for only one coefficient per cycle. Also, the conventional scan order determination method cannot start scan conversion of the next block before completion of scan conversion of one block. That is, a plurality of blocks cannot undergo scan conversion simultaneously.

SUMMARY OF INVENTION

The present invention has been made to overcome the conventional drawbacks, and provides a technique capable of more efficiently executing scan conversion.

According to the first aspect of the invention, there is provided a scan conversion apparatus which scans a block formed from N data of a two-dimensional array and sorts the data into one-dimensional array data, the apparatus comprising:

holding means for holding scan order information which is determined based on an appearance frequency of significant data at each position in a block scanned in the past and indicates a scan order in the block;

first scan conversion means for scanning N data which form a first block, in an order indicated by the scan order information, and outputting the N data as one-dimensional array data;

update means for, when data at a position A in a block is significant data during scanning by the first scan conversion means, updating an appearance frequency corresponding to the position A;

swapping means for, when an appearance frequency (of significant data) at a position B (in the block) corresponding to a scan turn immediately before the position A is smaller than the appearance frequency (of significant data) at the position A after update by the update means, swapping the scan orders of the position A and position B that are indicated by the scan order information; and second scan conversion means for reading out N data which form a second block following the first block, in an order indicated by the scan order information, and outputting the N data as one-dimensional array data, wherein the second scan conversion means starts scanning the second block before completion of scanning the first block by the first scan conversion means, and when the first scan conversion means scans Ith data of the first block, the second scan conversion means scans (I−K)th (K is at least 2) data of the second block at earliest in order to reflect a swapping result by the swapping means along with scanning of the first block by the first scan conversion means.

According to the second aspect of the invention, there is provided a method of controlling a scan conversion apparatus which scans a block formed from N data of a two-dimensional array and sorts the data into one-dimensional array data, the method comprising:

a holding step of holding scan order information which is determined based on an appearance frequency of significant data at each position in a block scanned in the past and indicates a scan order in the block;

a first scan conversion step of scanning N data which form a first block, in an order indicated by the scan order information, and outputting the N data as one-dimensional array data;

an update step of, when data at a position A in a block is significant data during scanning in the first scan conversion step, updating an appearance frequency corresponding to the position A;

a swapping step of, when an appearance frequency (of significant data) at a position B (in the block) corresponding to a scan turn immediately before the position A is smaller than the appearance frequency (of significant data) at the position A after update in the update step, swapping the scan orders of the position A and position B that are indicated by the scan order information; and a second scan conversion step of reading out N data which form a second block following the first block, in an order indicated by the scan order information, and outputting the N data as one-dimensional array data, wherein in the second scan conversion step, scanning of the second block starts before completion of scanning of the first block in the first scan conversion step, and when Ith data of the first block is scanned in the first scan conversion step, (I−K)th (K is at least 2) data of the second block is scanned at earliest (in the second scan conversion step) in order to reflect a swapping result in the swapping step along with scanning of the first block in the first scan conversion step.

According to the third aspect of the invention, there is provided a scan conversion apparatus which scans a block formed from N data of a two-dimensional array and sorts the data into one-dimensional array data so as to collect significant data first and then collect insignificant data after the significant data, the apparatus comprising:

setting means for pairing position information indicating a position of each data in the block and statistical information indicating an appearance frequency of significant data at the position of each data, and setting sorted information by sorting pieces of statistical information in a descending order;

M ($2 \leq M \leq N/2$) scan conversion means each for reading out N data which form a supplied block, in an order based on the position information in the sorted information, outputting the N data as one-dimensional array data, and outputting information indicating whether readout data is significant data, the M scan conversion means being capable of parallelly running;

statistical information update means for, when one of the M scan conversion means outputs information indicating that ith data is significant data, updating statistical information corresponding to a position of the ith data;

swapping means for, when a relationship between statistical information to be updated and immediately preceding statistical information becomes an ascending order relationship as a result of update by the statistical information update means, swapping two pieces of sorted information containing the pieces of statistical information having the ascending order relationship; and control means for assigning priority levels to the M scan conversion means as first to Mth scan conversion means, and causing each scan conversion means to start scanning data at a timing delayed by at least two data from scan conversion means higher in priority level by one than the each scan conversion means.

According to the fourth aspect of the invention, there is provided an image encoding apparatus which encodes image data, the apparatus comprising:

image division means for dividing an image into blocks each formed from n rows and m columns;

orthogonal transform means for performing orthogonal transform for each block output from the image division means, and outputting transform coefficients;

a scan conversion apparatus defined in claim 1 or 3 which parallelly sorts transform coefficients of M blocks output from the orthogonal transform means; and entropy encoding means for entropy-encoding the transform coefficients of the M blocks output from the scan conversion apparatus, and outputting an encoded stream.

According to the fifth aspect of the invention, there is provided a scan conversion apparatus which scans a block formed from N data of a two-dimensional array and sorts the data into one-dimensional array data so as to collect significant data first and then collect insignificant data after the significant data, the apparatus comprising:

setting means for pairing position information indicating a position of each data in the block and statistical information indicating an appearance frequency of significant data at the position of each data, and setting sorted information by sorting pieces of statistical information in a descending order;

M ($2 \leq M$) scan conversion means each for reading out N data which form a supplied block, in an order based on the position information in the sorted information, outputting the N data as one-dimensional array data, and outputting information indicating whether readout data is significant data, the M scan conversion means being capable of parallelly running;

statistical information update means for, when the M scan conversion means parallelly sorts ith data, updating statistical information corresponding to a position of the ith data in accordance with the number of scan conversion means that have output information indicating that the ith data is significant data; and swapping means for, when a relationship between statistical information to be updated and immediately preceding statistical information becomes an ascending order relationship as a result of update by the statistical information update means, swapping two pieces of sorted information containing the pieces of statistical information having the ascending order relationship, wherein priority levels are assigned to the M scan conversion means as first to Mth scan conversion means, and each scan conversion means includes holding means for holding data sorted at a timing immediately before sorting ith data, determination means for determining whether a relation "ScanTotals[i−1]$\geq$ScanTotals[i]+L" is satisfied, where L is the number of scan conversion means which have output information indicating that the ith data is significant data and are higher in priority level than the each scan conversion means, and ScanTotals[i] is ith statistical information, and selection means for, when a determination result of the determination means represents that the relation "ScanTotals[i−1]$\geq$ScanTotals[i]+L" is satisfied, outputting data held by the holding means and then holding currently sorted data in the holding means, and when the determination result of the determination means represents "ScanTotals[i−1]<ScanTotals[i]+L", outputting currently sorted data.

According to the sixth aspect of the invention, there is provided an image encoding apparatus which encodes image data, the apparatus comprising:

image division means for dividing an image into blocks each formed from n rows and m columns;

orthogonal transform means for performing orthogonal transform for each block output from the image division means, and outputting transform coefficients;

a scan conversion apparatus defined in claim 5 which parallelly sorts transform coefficients of M blocks output from the orthogonal transform means; and entropy encoding means for entropy-encoding the transform coefficients of the M blocks output from the scan conversion apparatus, and outputting an encoded stream.

According to the seventh aspect of the invention, there is provided a method of controlling a scan conversion apparatus which parallelly sorts M blocks each formed from N data of a two-dimensional array into one-dimensional array data so as to collect significant data first and then collect insignificant data after the significant data, the method comprising:

a setting step of pairing position information indicating a position of each data in the block and statistical information indicating an appearance frequency of significant data at the position of each data, and setting sorted information by sorting pieces of statistical information in a descending order;

M ($2 \leq M \leq N/2$) scan conversion steps each of reading out N data which form the block, in an order based on the position information in the sorted information, outputting the N data as one-dimensional array data, and outputting information indicating whether readout data is significant data, the M scan conversion steps being capable of parallelly running;

a statistical information update step of, when information indicating that ith data is significant data is output in one of the M scan conversion steps, updating statistical information corresponding to a position of the ith data;

a swapping step of, when a relationship between statistical information to be updated and immediately preceding statistical information becomes an ascending order relationship as a result of update in the statistical information update step, swapping two pieces of sorted information containing the pieces of statistical information having the ascending order relationship; and a control step of assigning priority levels to the M scan conversion steps as first to Mth scan conversion steps, and starting scanning data in each scan conversion step at a timing delayed by at least two data from a scan conversion step higher in priority level by one than each scan conversion step.

According to the eighth aspect of the invention, there is provided a method of controlling an image encoding apparatus which encodes image data, the method comprising:

an image division step of dividing an image into blocks each formed from n rows and m columns;

an orthogonal transform step of performing orthogonal transform for each block output in the image division step, and outputting transform coefficients;

a processing step of supplying transform coefficients of M blocks output in the orthogonal transform step to a scan conversion apparatus defined in claim 1 or 3 which parallelly sorts the transform coefficients; and an entropy encoding step of entropy-encoding the transform coefficients of the M blocks output from the scan conversion apparatus, and outputting an encoded stream.

According to the ninth second aspect of the invention, there is provided a method of controlling a scan conversion apparatus which parallelly sorts M blocks each formed from N data of a two-dimensional array into one-dimensional array data so as to collect significant data first and then collect insignificant data after the significant data, the method comprising:

a setting step of pairing position information indicating a position of each data in the block and statistical information indicating an appearance frequency of significant data at the position of each data, and setting sorted information by sorting pieces of statistical information in a descending order;

M ($2 \leq M$) scan conversion steps each of reading out N data which form the block, in an order based on the position information in the sorted information, outputting the N data as one-dimensional array data, and outputting information indicating whether readout data is significant data, the M scan conversion steps being capable of parallelly running;

a statistical information update step of, when ith data are parallelly sorted in the M scan conversion steps, updating statistical information corresponding to a position of the ith data in accordance with the number of scan conversion steps in which information indicating that the ith data is significant data have been output; and a swapping step of, when a relationship between statistical information to be updated and immediately preceding statistical information is an ascending order relationship as a result of update in the statistical information update step, swapping two pieces of sorted information containing the pieces of statistical information having the ascending order relationship, wherein priority levels are assigned to the M scan conversion steps as first to Mth scan conversion steps, and each scan conversion step includes a holding step of holding data sorted at a timing immediately before sorting ith data, a determination step of determining whether a relation "ScanTotals[i−1]$\geq$ScanTotals[i]+L" is satisfied, where L is the number of scan conversion steps in which information indicating that the ith data is significant data have been output and which are higher in priority level than each scan conversion step, and ScanTotals[i] is ith statistical information, and a selection step of, when a determination result in the determination step represents that the relation "ScanTotals[i−1]$\geq$ScanTotals[i]+L" is satisfied, outputting data held in the holding step and then holding currently sorted data in the holding step, and when the determination result in the determination step represents "ScanTotals[i−1]<ScanTotals[i]+L", outputting currently sorted data.

According to the tenth aspect of the invention, there is provided a method of controlling an image encoding apparatus which encodes image data, the method comprising:

an image division step of dividing an image into blocks each formed from n rows and m columns;

an orthogonal transform step of performing orthogonal transform for each block output in the image division step, and outputting transform coefficients;

a processing step of supplying transform coefficients of M blocks output in the orthogonal transform step to a scan conversion apparatus defined in claim 5 which parallelly sorts the transform coefficients; and an entropy encoding step of entropy-encoding the transform coefficients of the M blocks output from the scan conversion apparatus, and outputting an encoded stream.

According to the present invention, data in substantially M blocks can be parallelly sorted though statistical information is updated. When the present invention is applied to an image encoding technique of encoding data into a run length for each block, encoding processing can be quickly achieved.

Further features of the present invention will become apparent from the following description of exemplary embodiments with reference to the attached drawings.

BRIEF DESCRIPTION OF DRAWINGS

FIGS. 3A to 3E are views showing patterns each representing the scan order of two-dimensional array data;

FIGS. 7A and 7B are views exemplifying statistical information and scan order information;

FIGS. 10A and 10B are circuit diagrams of a scan order update unit and statistical information update unit in FIG. 1;

FIG. 15 is a table showing the determination table of a determination unit in FIG. 13.

DESCRIPTION OF EMBODIMENTS

Preferred embodiments of the present invention will be described below with reference to the accompanying drawings.

First Embodiment

An image processing apparatus having a function of encoding an image and a function of decoding an encoded image will be explained as a form in which the embodiment is industrially applicable. Encoding targets by the image encoding function are an image read out from the image sensing device of a digital camera or digital camcorder, and an image received via a network.

Figure 8:
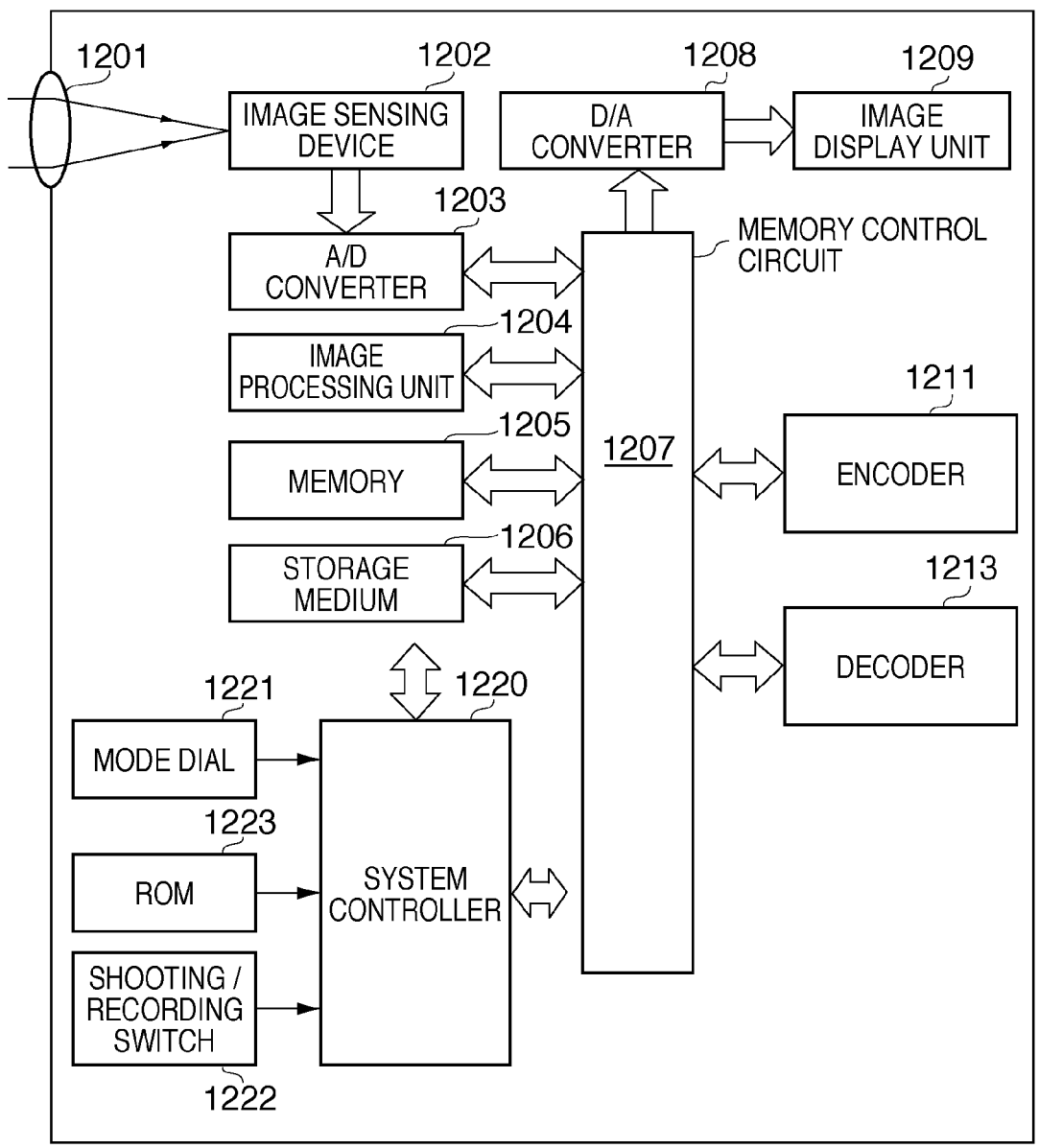
FIG. 8 is a block diagram of the arrangement of a digital camera.

A digital camera having an arrangement in FIG. 8 will be exemplified. An image to be sensed is formed on an image sensing device 1202 such as a CCD sensor or CMOS sensor via a lens 1201. The image sensing device 1202 converts the formed image into an analog signal, and sends the analog signal to a subsequent A/D converter 1203.

The A/D converter 1203 converts the analog signal received from the image sensing device 1202 into a digital signal. A memory control circuit 1207 acquires the converted digital signal as data (image data) from the A/D converter 1203, and sends the image data to an image processing unit 1204. The image processing unit 1204 performs well-known image interpolation processing, color conversion processing, and the like for the image data.

The memory control circuit 1207 acquires, from the image processing unit 1204, the image data processed by the image processing unit 1204, and stores the acquired image data in a memory 1205. The memory 1205 temporarily stores data of a sensed still image or moving image, and has an area for storing a predetermined number of still images (still images of a predetermined number of frames). The memory 1205 is a readable/writable memory. The memory control circuit 1207 includes a plurality of memory control units dedicated to writing data in the memory 1205, and a plurality of memory control units dedicated to reading out data from the memory 1205.

The memory control circuit 1207 reads out again image data stored in the memory 1205, and sends it to a D/A converter 1208 and encoder 1211. The D/A converter 1208 converts the image data into an analog signal, and sends the converted analog signal to an image display unit 1209. The display screen of the image display unit 1209 displays (plays back) an image (sensed image) represented by the analog signal.

The encoder 1211 generates an encoded stream from the image data (input image) received from the memory control circuit 1207. The memory control circuit 1207 records the encoded stream generated by the encoder 1211 on a storage medium 1206. The storage medium 1206 can be a medium removable from the image processing apparatus, such as an SD card.

The digital camera has a mode dial 1221 to be manipulated by a user. The mode dial 1221 allows the user to select either the shooting mode or playback mode. When the user manipulates the mode dial 1221 to select the shooting mode, a system controller 1220 controls the operations of respective units which build the image processing apparatus, so that shooting processing can be started. More specifically, the system controller 1220 controls the image display unit 1209 to display an image based on image data of an image obtained via the lens 1201. When the user turns on a shooting/recording switch 1222 while selecting the shooting mode with the mode dial 1221, shooting processing starts. More specifically, image data of the image obtained via the lens 1201 is encoded and recorded as an encoded stream on the storage medium 1206.

When the user manipulates the mode dial 1221 to select the playback mode, the system controller 1220 controls the operations of respective units which build the image processing apparatus, and achieves each processing to be described later.

The memory control circuit 1207 sequentially reads out encoded streams recorded on the storage medium 1206, and sends the readout encoded streams to a decoder 1213. The decoder 1213 decodes the encoded stream received from the memory control circuit 1207. The decoder 1213 holds one decoded image. A ROM 1223 stores setting data of the image processing apparatus, and computer programs to be executed by the system controller 1220. The ROM 1223 further stores data which will be explained as known data in processing to be described later. More specifically, the system controller 1220 executes processing using the computer programs and data stored in the ROM 1223, thereby controlling the operations of respective units which build the digital camera. The digital camera according to the embodiment implements each processing to be described below.

[Encoder 1211]

Figure 2A:
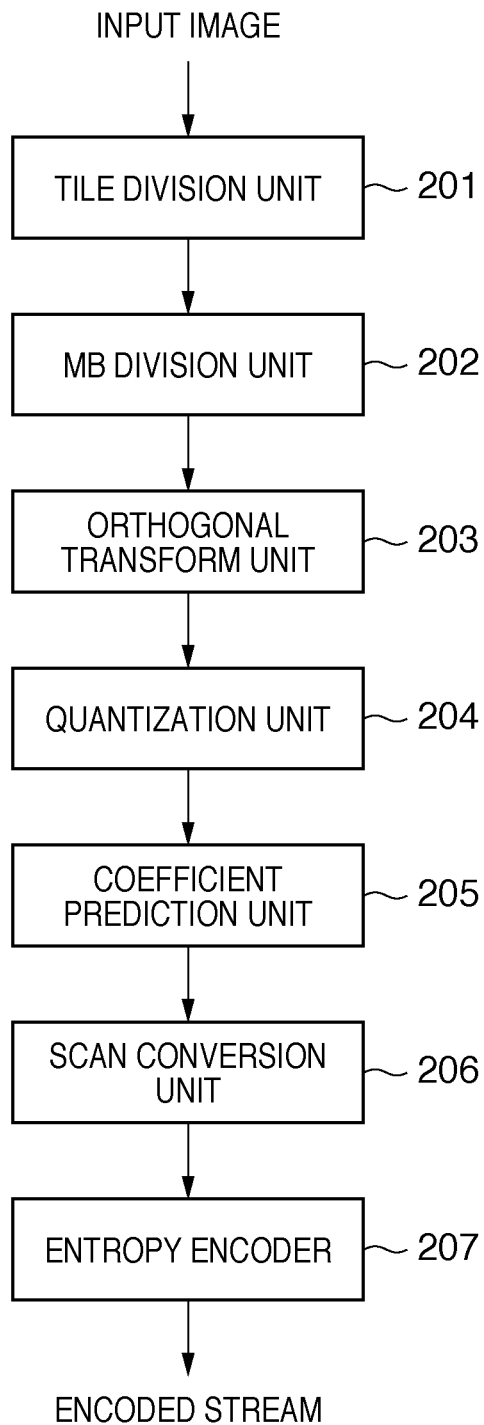
FIGS. 2A and 2B are block diagrams of the arrangements of an image encoder and decoder.

FIG. 2A is a block diagram exemplifying the detailed functional arrangement of the encoder 1211. Respective units shown in FIG. 2A are assumed to be formed from hardware, but some or all of them may be implemented by computer programs.

When the encoder 1211 receives one image data, a tile division unit 201 divides the input image data into one or more tiles, and outputs each tile to an MB division unit 202. The MB division unit 202 divides one input tile data into macroblocks (MBs) each serving as an encoding unit, and outputs each MB to an orthogonal transform unit 203. Thus, processes by the orthogonal transform unit 203 and subsequent units are executed for each MB. Although an encoding operation for encoding one MB will be explained, the same operation is performed for the remaining MBs.

The orthogonal transform unit 203 orthogonally transforms the input MB data, converts color space data into transform coefficients in the frequency space, and outputs them. In lossy encoding to color space data, a quantization unit 204 quantizes the transform coefficients to decrease the dynamic range of the transform coefficients. When the image data pattern lies across a plurality of blocks, a coefficient prediction unit 205 performs coefficient prediction for the quantized transform coefficients in accordance with respective frequency bands, further decreasing the level of the transform coefficients. When the quantization value changes depending on the coefficient position in the block or changes between blocks, coefficient prediction processing may be omitted even if the image data pattern lies across a plurality of blocks. The quantized transform coefficients having undergone the coefficient prediction are input as two-dimensional data to a scan conversion unit 206. The scan conversion unit 206 scans the two-dimensional transform coefficients to sort the transform coefficients into one-dimensional data having high encoding efficiency, and output the one-dimensional data. As ideal sorting at this time, significant coefficients (significant data) are positioned first and then insignificant coefficients (run (zeros)=insignificant data) continue after them. An entropy encoder 207 entropy-encodes (run-length-encodes) the sorted one-dimensional data, generating an encoded stream. A method of changing the scan order for each block is suited to an encoding method in which the quantization value and coefficient prediction method can be changed for each block. In the encoder 1211 which determines a scan order for each block and performs scan conversion, as described even in Description of the Related Art, circuits are formed on a semiconductor to perform scan conversion in parallel for two or more blocks. The arrangement regarding scan conversion that enables the parallel processing will be described later.

[Decoder 1213]

Figure 2B:
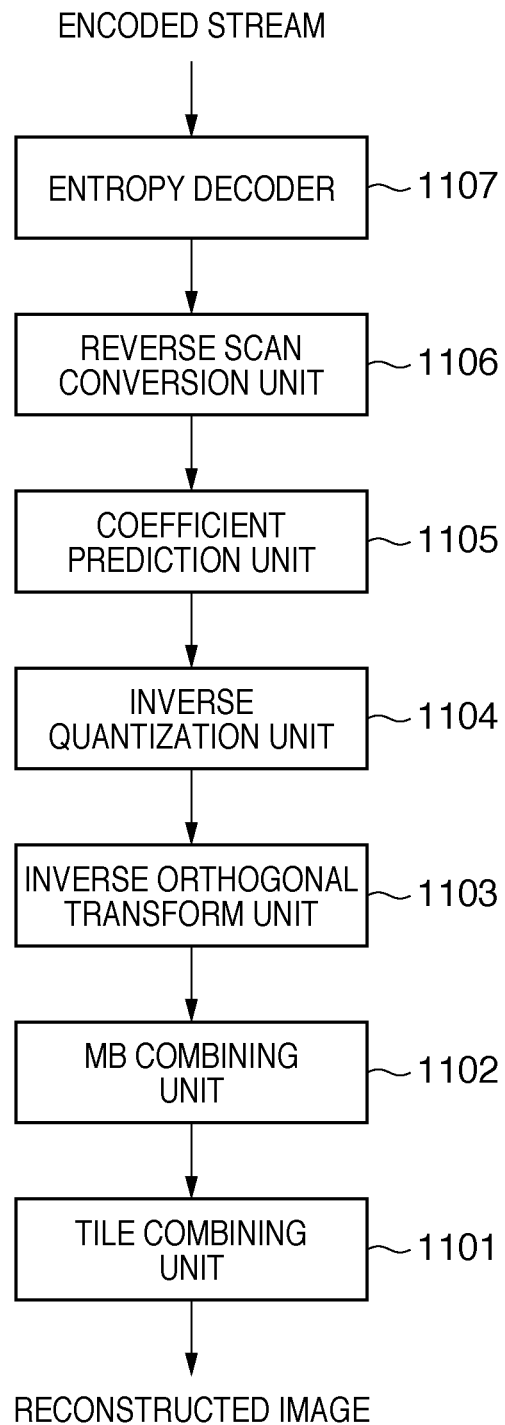

The decoder 1213 will be described with reference to FIG. 2B. Respective units shown in FIG. 2B are assumed to be formed from hardware, but some or all of them may be implemented by computer programs. The decoder 1213 receives the encoded stream of each image. An entropy decoder 1107 decodes the code word of the input encoded stream, obtaining predictively transform coefficient error data. A reverse scan conversion unit 1106 performs reverse scan conversion for the decoded predictively transform coefficient error data, converting the one-dimensional scan order into the two-dimensional one. A coefficient prediction unit 1105 adds a prediction error to the decoded predictively transform coefficient error data, obtaining quantized transform coefficients. After that, an inverse quantization unit 1104 performs inverse quantization, and an inverse orthogonal transform unit 1103 executes inverse orthogonal transform, reconstructing color space data. By this processing, MB data can be reconstructed. An MB combining unit 1102 combines respective MB data, reconstructing one tile. A tile combining unit 1101 combines respective tiles, reconstructing an image.

By these procedures, the decoder 1213 reconstructs an image from an encoded stream, and sends the reconstructed image to the memory control circuit 1207. Processes by the respective decoding units are well known, and a further description thereof will be omitted. The following embodiment is related to the encoder 1211 and decoder 1213 described above, and is an example when the present invention for parallelly processing scan conversion is concretely practiced.

[Description of Scan Conversion Unit]

The scan conversion unit 206 according to the first embodiment executes scan conversion simultaneously for the transform coefficients of a plurality of (two in the embodiment) blocks. Data to undergo scan conversion are quantized block transform coefficients or predictively encoded blocks (1 block=4×4 transform coefficients), as described above. The scan order is updated for each block, and the scan order and additional information accompanying the update of the scan order are causally determined.

Figure 1:
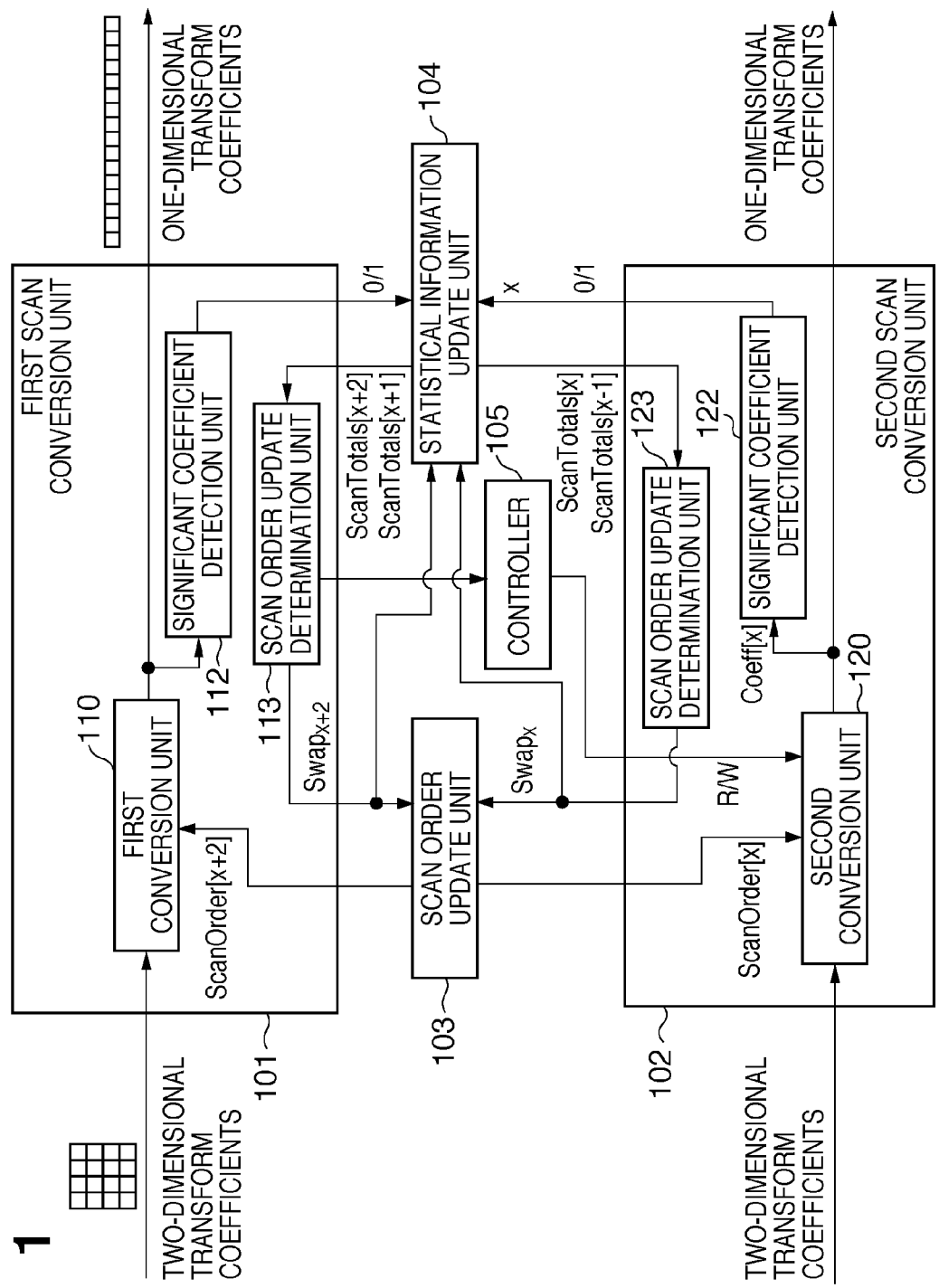
FIG. 1 is a block diagram of the arrangement of a scan conversion unit in the first embodiment.

As represented by the hardware arrangement in the block diagram of FIG. 1, the scan conversion unit 206 according to the first embodiment includes a first scan conversion unit 101, second scan conversion unit 102, scan order update unit 103, statistical information update unit 104, and controller 105. The first scan conversion unit 101 includes a first conversion unit 110, significant coefficient detection unit 112, and scan order update determination unit 113. The second scan conversion unit 102 includes a second conversion unit 120, significant coefficient detection unit 122, and scan order update determination unit 123.

The first scan conversion unit 101 performs scan conversion for the transform coefficients of an input block, and updates the next scan order based on the converted scan order. The second scan conversion unit 102 executes scan conversion for the transform coefficients of an in input block in accordance with the scan order updated by the first scan conversion unit 101, and updates the next scan conversion based on the converted scan order. The scan order update unit 103 updates and holds the scan order using determination results input from the first scan conversion unit 101 and second scan conversion unit 102.

The statistical information update unit 104 totals and holds a significant coefficient detection count at the position of a transform coefficient in an input block using significant coefficient detection results input from the first scan conversion unit 101 and second scan conversion unit 102. The controller 105 controls the timing to start conversion by the second conversion unit 120 in the second scan conversion unit 102. The first conversion unit 110 executes scan conversion for input block data using scan information from the scan order update unit 103. The second conversion unit 120 executes scan conversion for the transform coefficients of an input block using scan information from the scan order update unit 103 in accordance with a control signal input from the controller 105. The significant coefficient detection unit 122 detects a significant coefficient (nonzero). Based on the statistical result of the statistical information update unit 104, the scan order update determination unit 123 determines whether to update the scan order.

Figure 4:
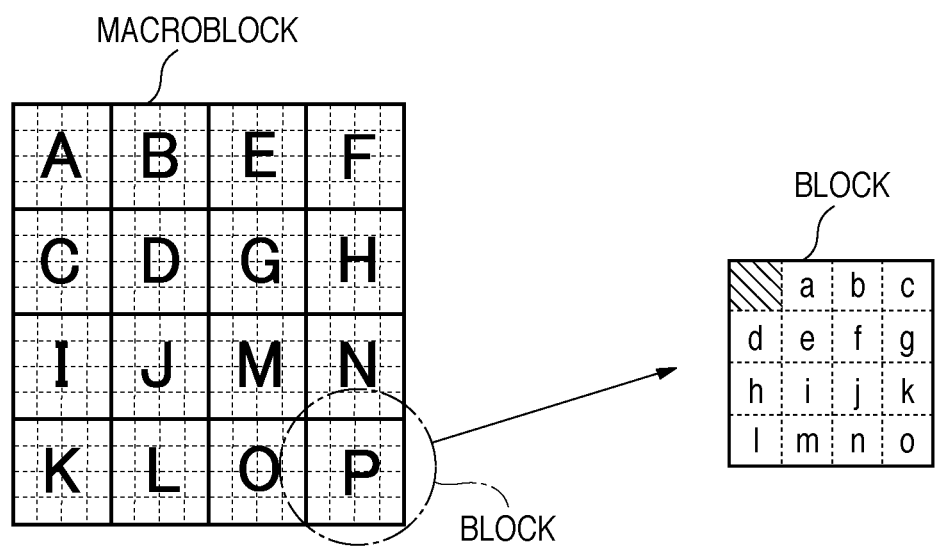
FIG. 4 is a view showing the relationship between the array of data in a block, and the macroblock.
Figure 5:
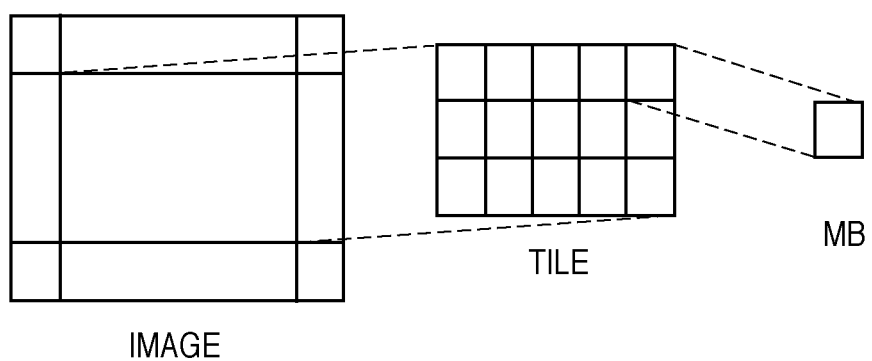
FIG. 5 is a view showing the relationship between the image, the tile, and the macroblock.

More detailed processing contents of the scan conversion unit 206 in FIG. 1 will be explained. As shown in FIG. 4, the scan conversion unit 206 receives the transform coefficients of 4×4=16 blocks from the coefficient prediction unit 205. As shown in FIG. 4, the respective blocks undergo scan conversion in the order of A to P. To parallelly perform scan conversion for two blocks, assume that 16 blocks which form an MB are processed for every pair (X,Y) in the following order:

$$(A,B) \rightarrow (C,D) \rightarrow (E,F) \rightarrow (G,H) \rightarrow (I,J) \rightarrow (K,L) \rightarrow (M,N) \rightarrow (O,P)$$

Figure 11A:
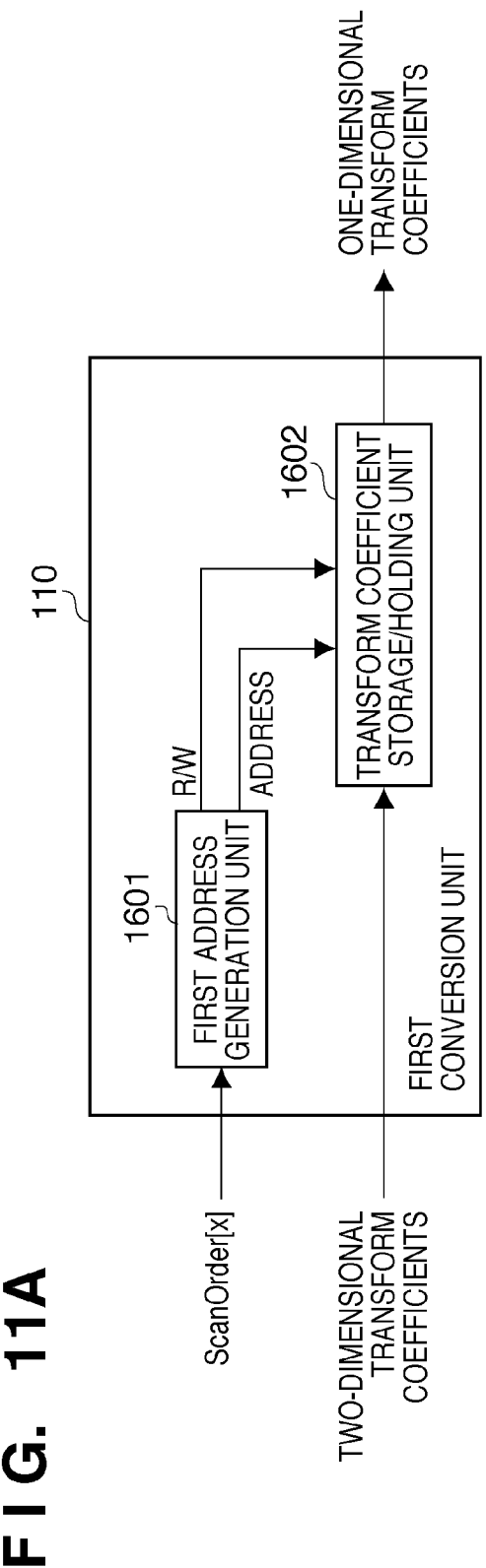
FIGS. 11A and 11B are block diagrams of the first and second conversion units in FIG. 1.

A block corresponding to X of the pair (X,Y) will be called "block X", and one corresponding to Y will be called "block Y". In the embodiment, a scan order used for scan conversion of block Y is determined based on the transform coefficients of block X and a scan order used for scan conversion of block X. The transform coefficients of block X are input to the first scan conversion unit 101 and sorted into one-dimensional data. Processing of sorting the two-dimensional transform coefficients of block X into one-dimensional ones will be explained with reference to FIG. 11A.

First, a first address generation unit 1601 outputs addresses and write signals to a transform coefficient storage/holding unit 1602 in a preset order. The transform coefficient storage/holding unit 1602 stores and holds the input two-dimensional transform coefficients (in the embodiment, 15 transform coefficients corresponding to lower-case alphabetic letters a to o in FIG. 4). Then, the first address generation unit 1601 reads out one ScanOrder[1] among scan orders (see FIG. 7B) held in the scan order update unit 103, and generates a read address for reading out one of the transform coefficients stored in the transform coefficient storage/holding unit 1602. In other words, each ScanOrder[ ] is an offset address from the start address in the transform coefficient storage/holding unit 1602. That is, the first address generation unit 1601 calculates a read address by adding an offset address indicated by the readout ScanOrder[ ] to the start address of the first address generation unit 1601. The first address generation unit 1601 outputs the calculated read address to the transform coefficient storage/holding unit 1602, and also outputs a read signal. In response to this, the transform coefficient storage/holding unit 1602 outputs one stored transform coefficient as a one-dimensionally transform coefficient. Next, the first address generation unit 1601 reads out ScanOrder[2] serving as the next scan turn (see FIG. 7B) held in the scan order update unit 103, and executes the same processing. The first address generation unit 1601 repeats this processing till ScanOrder[15]. For example, when the scan order stored in the scan order update unit 103 is one as shown in FIG. 7B, the transform coefficients of an input two-dimensional array are output in the original order as transform coefficients of a one-dimensional array. Hence, the transform coefficients of block X can be sorted into an order capable of efficient entropy encoding.

Transform coefficients sent from the transform coefficient storage/holding unit 1602 are supplied to the entropy encoder 207, as described above, and also supplied to the significant coefficient detection unit 112 in order to determine the scan order of block Y. The significant coefficient detection unit 112 analyzes the level of an input transform coefficient. When the level of the transform coefficient is not 0 (zero), i.e., the transform coefficient of interest is nonzero, the significant coefficient detection unit 112 determines that the transform coefficient of interest is a significant coefficient, and supplies the determination result (which suffices to be 1 bit) to the statistical information update unit 104. The statistical information update unit 104 updates the significant coefficient generation frequency (appearance frequency) for the scan turn of interest using the detection result of the significant coefficient detection unit 112. For example, when x represents the current scan turn of interest and the transform coefficient of interest is a significant coefficient, the statistical information update unit 104 increments (increases) the value of statistical information ScanTotals[x] shown in FIG. 7A by "1". If the transform coefficient of interest is not a significant coefficient (insignificant coefficient=0), the statistical information update unit 104 does not change the value of the scan turn of interest in the statistical information table ScanTotals [x]. When the transform coefficient of interest is a significant coefficient, the statistical information update unit 104 supplies the updated statistical information ScanTotals[x] of the scan turn of interest and statistical information ScanTotals[x−1] of an immediately preceding scan turn to the scan order update determination unit 113. When the transform coefficient of interest is an insignificant coefficient, the statistical information update unit 104 notifies the scan order update determination unit 113 that the supplied pieces of statistical information ScanTotals[x] and ScanTotals[x−1] are invalid, so as not to perform scan order update determination by the scan order update determination unit 113. Alternatively, the statistical information update unit 104 supplies pieces of statistical information ScanTotals[x] and ScanTotals[x−1] with which the scan order update determination unit 113 obtains the same result as that when making no scan order update determination.

The scan order update determination unit 113 compares the received pieces of statistical information ScanTotals[x] and ScanTotals[x−1]. If the relationship between ScanTotals[x] and ScanTotals[x−1] is a descending order as a result of the comparison, i.e., "ScanTotals[x−1]≧ScanTotals[x]", the scan order update determination unit 113 determines that the scan order of interest applied to block X is optimum. The scan order update determination unit 113 therefore outputs, to the scan order update unit 103, a signal for maintaining the relationship between the scan orders ScanOrder[x−1] and ScanOrder[x] at that point. If the scan order update determination unit 113 determines that "ScanTotals[x−1]<ScanTotals[x]", this means that the relationship between these pieces of statistical information ScanTotals[ ] is an ascending order. Thus, the scan order update determination unit 113 outputs an instruction to the statistical information update unit 104 to swap values held in ScanTotals[x−1] and ScanTotals[x]. At the same time, the scan order update determination unit 113 outputs an instruction to the scan order update unit 103 to swap the pieces of scan order information ScanOrder[x−1] and ScanOrder[x]. Upon receiving this instruction, the statistical information update unit 104 swaps the internally held values of ScanTotals[x−1] and ScanTotals[x]. Also, the scan order update unit 103 swaps the internally held pieces of scan order information ScanOrder[x−1] and ScanOrder[x]. By repetitively executing the foregoing processing, the scan order of block Y can be determined simultaneously when scan conversion of block X is performed.

A case in which the scan turn of interest in block X is x will be examined. In this case, only when a transform coefficient indicated by the scan turn x of interest is a significant coefficient, ScanOrder[x] and an immediately preceding scan order ScanOrder[x−1] may be swapped. In other words, for the scan turn x of interest, ScanOrder[1], ScanOrder[2], . . . , ScanOrder[x−2] can be regarded to be finalized for scan conversion of block Y. Thus, the controller 105 in the first embodiment controls the second scan conversion unit 102 to scan the (x−2)th transform coefficient at a timing to perform scan conversion for the xth transform coefficient after the start of scan conversion of block X by the first scan conversion unit 101. "x−2" is a value of 1 or more, so the controller 105 controls the second scan conversion unit 102 to perform scan conversion for the first transform coefficient of block Y at a timing to perform scan conversion for the third transform coefficient of block X by the first scan conversion unit 101.

Processing by the second scan conversion unit 102 will be described. Under the control of the controller 105, the second conversion unit 120 of the second scan conversion unit 102 performs scan conversion for the transform coefficients of input block Y in accordance with scan order information from the scan order update unit 103, and outputs the resultant transform coefficients to the entropy encoder 207. The significant coefficient detection unit 122 and scan order update determination unit 123 in the second scan conversion unit 102 update statistical information ScanTotals[ ] and scan order information similarly to the significant coefficient detection unit 112 and scan order update determination unit 113 described above.

Figure 11B:
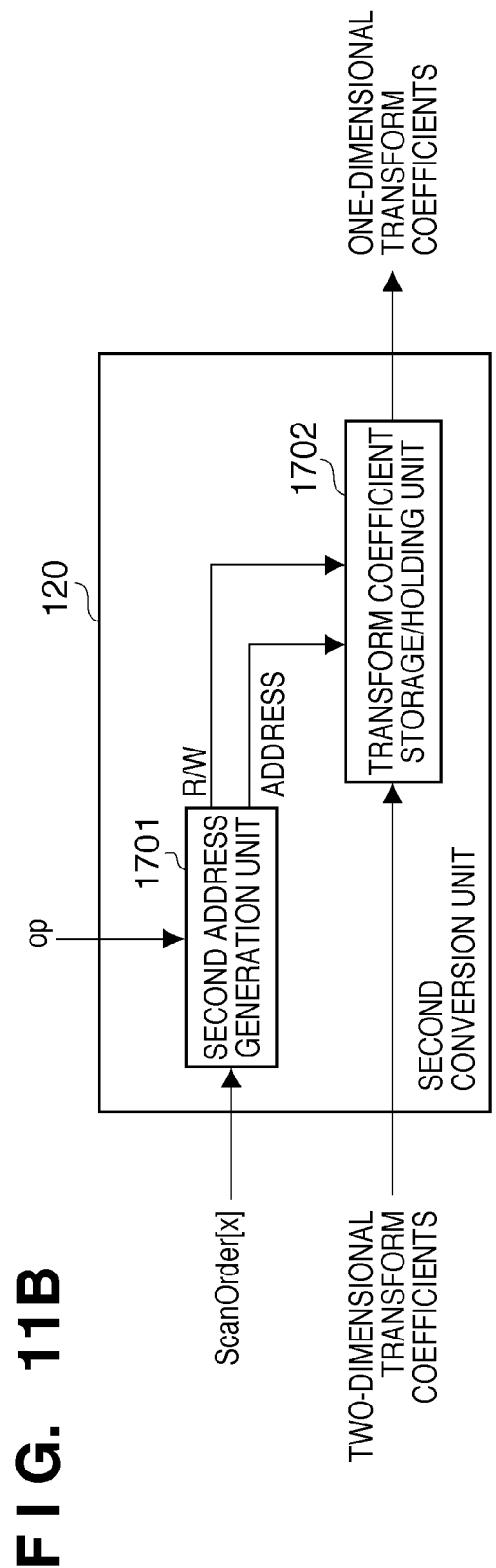

The arrangement and processing of the second conversion unit 120 will be explained with reference to FIG. 11B. A transform coefficient storage/holding unit 1702 stores and holds the two-dimensional transform coefficients (in the embodiment, corresponding to lower-case alphabetic letters a to o in FIG. 4) of block Y. In response to an execution start instruction signal from the controller 105, a second address generation unit 1701 reads out one ScanOrder[1] among scan orders (see FIG. 7B) held in the scan order update unit 103, and generates an address for reading out one of the transform coefficients stored in the transform coefficient storage/holding unit 1702. The second address generation unit 1701 outputs the generated address to the transform coefficient storage/holding unit 1702, and also outputs a read signal. In response to this, the transform coefficient storage/holding unit 1702 outputs one stored transform coefficient as a one-dimensionally transform coefficient. Next, the second address generation unit 1701 reads out one ScanOrder[2] among scan orders (see FIG. 7B) held in the scan order update unit 103, and executes the same processing. The second address generation unit 1701 repeats this processing till ScanOrder[15]. Accordingly, the transform coefficients of block Y can be sorted into an order capable of efficient entropy encoding. The second scan conversion unit 102 can determine a scan order used for block X at the next timing simultaneously when performing scan conversion of block Y. Even for a scan conversion result obtained by the second scan conversion unit 102, the scan order update unit 103 and statistical information update unit 104 execute almost the same processes as those upon receiving a scan conversion result from the first scan conversion unit 101. For example, when the scan conversion unit 206 in the embodiment is now processing a block pair (A,B), the second scan conversion unit 102 determines a scan order used for block C of the next block pair (C,D). In this case, when x indicates the turn of a transform coefficient during scan conversion by the second scan conversion unit 102, it suffices to process a transform coefficient corresponding to a turn x−2 preceding by two at the timing to start processing block C by the first scan conversion unit 101.

In the embodiment, the two scan conversion units 101 and 102 share ScanTotals and ScanOrder of one block. Strictly speaking, the two scan conversion units 101 and 102 always update different scan orders, thereby obtaining scan orders equivalent to those when scan orders are updated one by one for respective blocks. Next, the statistical information update unit 104 and scan order update unit 103 will be explained.

FIG. 10A is a circuit diagram exemplifying the arrangement of the scan order update unit 103 in FIG. 1. As shown in FIG. 10A, scan order information ScanOrder[ ] is stored and held in a ring buffer. First, latches $D_S1$ to $D_S14$ which form the ring buffer are initialized to initial values in an initial scan order as shown in FIG. 7B. In initialization, the latch $D_S4$ stores and holds ScanOrder[0], and the latch $D_S5$ stores and holds ScanOrder[1]. In this way, each ScanOrder element corresponds to each latch. In initialization, ScanOrder[14] corresponds to $D_S0$, and ScanOrder[15] corresponds to $D_S1$. Then, each latch sends a held scan turn to a preceding latch every cycle, and stores and holds a scan turn input from a subsequent latch. By bucket-bridging scan orders, the first and second scan conversion units 101 and 102 can always obtain, from the fixed latches, scan orders ScanOrder sequentially from the first one.

For example, while the scan order update unit 103 sends a scan turn ScanOrder[x+2] from the latch $D_S4$ to the first scan conversion unit 101, it sends a scan turn ScanOrder[x] from the latch $D_S2$ preceding by two to the second scan conversion unit 102.

Further, the latch $D_S4$ needs to send the scan turn of block X to the first scan conversion unit 101. Similarly, the latch $D_S2$ needs to send the scan turn of block Y to the second scan conversion unit 102. Thus, while the latch $D_S4$ holds and sends ScanOrder[x] of block X, the scan order update unit 103 executes scan order swapping processing between ScanOrder[x] and ScanOrder[x−1] to determine ScanOrder[x−1] of block Y. For example, the scan order update unit 103 performs scan order swapping processing between ScanOrder[x] and ScanOrder[x−1] using selectors 1401 and 1402 in accordance with update information SwapX input from the scan order update determination unit 113 of the first scan conversion unit 101. As a result, the latch $D_S2$ stores and holds ScanOrder[x−1] of block Y. Similarly, while the latch $D_S2$ holds and sends ScanOrder[x] of block Y, the scan order update unit 103 executes scan order swapping processing between ScanOrder[x] and ScanOrder[x−1] to determine ScanOrder[x−1] of the next block X. For example, the scan order update unit 103 performs scan order swapping processing between ScanOrder[x] and ScanOrder[x−1] using selectors 1403 and 1404 in accordance with update information SwapX input from the scan order update determination unit 123 of the second scan conversion unit 102. Accordingly, the latch $D_S0$ stores and holds ScanOrder[x−1] of block Y. As described above, while the scan order update unit 103 sends the scan turn ScanOrder[x] of block Y to the second scan conversion unit 102, it can send the scan turn ScanOrder[x+2] of block X to the first scan conversion unit 101.

The arrangement and processing of the statistical information update unit 104 will be explained with reference to FIG. 10B. Similar to the above-mentioned scan order update unit 103, the statistical information update unit 104 is also formed from a ring buffer, and latches $D_T0$ to $D_T14$ store and hold statistical information ScanTotals[ ]. Only a difference from FIG. 10A will be explained. Values as shown in FIG. 7A are set as initial values in the latches $D_T0$ to $D_T14$ which form the ring buffer in FIG. 10B. The value of each element of statistical information ScanTotals is incremented based on the detection result of the significant coefficient detection unit 112. For this purpose, an adder is interposed between the latches $D_T4$ and $D_T3$ to increment the value of statistical information ScanTotals[x] of block X sent from $D_T4$. Whether the addition value is 0 or 1 is determined depending on the detection result of the significant coefficient detection unit 112. For the same reason, an adder is interposed between the latches $D_T2$ and $D_T1$ to increment the value of statistical information ScanTotals[x] of block Y sent from $D_12$.

As described above, the scan conversion apparatus which parallelly performs scan conversion for a plurality of blocks can parallelly execute scan conversion using a causal scan order update method by directly controlling the output timing of sorted data in the second scan conversion unit 102.

Figure 6:
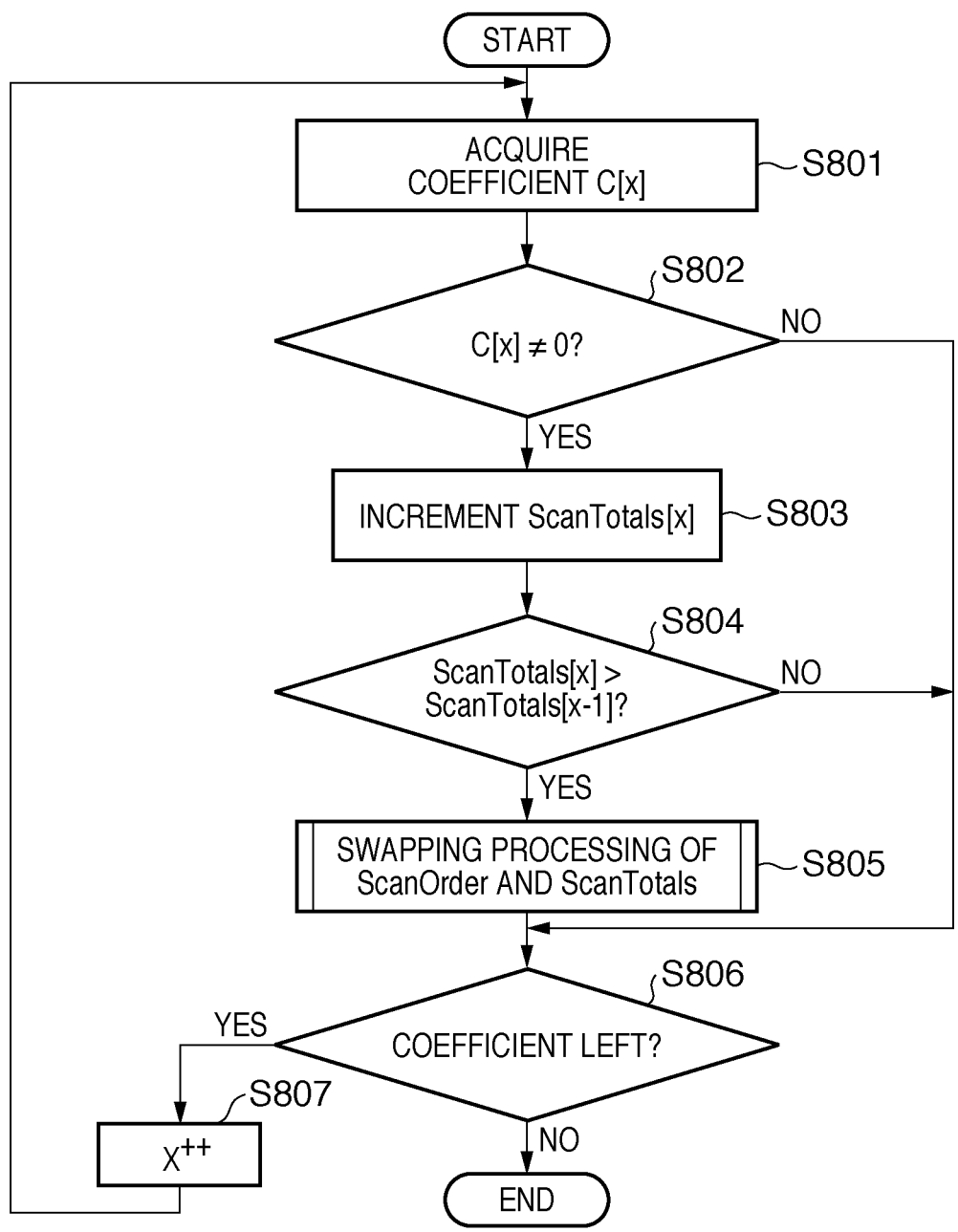
FIG. 6 is a flowchart of processing for determining a scan order in a block.

The correspondence between the steps of the scan order determination sequence shown in FIG. 6 described in Description of the Related Art and the building elements in FIG. 1 will be described. The significant coefficient detection unit 112 corresponds to S801 and S802. The statistical information update unit 104 corresponds to S803. The scan order update determination unit 113 corresponds to S804. The scan order update unit 103 corresponds to S805. The scan conversion unit in the embodiment may be assigned to a plurality of processors to control the task start timing.

The arrangement and operation of the scan conversion unit 206 in the first embodiment have been described. In the embodiment, the number of two-dimensional transform coefficients to undergo scan conversion in one block is 4×4−1=15. When the first scan conversion unit 101 performs scan conversion for the third and subsequent transform coefficients in block X, the second scan conversion unit 102 starts scan conversion for the first one of the transform coefficients of block Y. While employing this causal scan order update method, the scan conversion apparatus always parallelly executes scan conversion processing for two blocks. However, the parallel processing count is not limited to "2", and can be increased to "3" or more. A case in which the parallel count is m will be explained. In this case, the (n−1)th scan conversion unit (1≦n<m) performs scan conversion for the transform coefficients of a given block. At a timing delayed by two data, the nth scan conversion unit starts scan conversion for the first one of the transform coefficients of another block. Note that when the mth (final) scan conversion unit starts scan conversion for the transform coefficients of a given block and performs it for the third and subsequent transform coefficients, the first scan conversion unit needs to start scan conversion for the first one of the transform coefficients of another block. That is, when the number of two-dimensional transform coefficients is M, the maximum parallel processing count in scan conversion is "M/2".

[Description of Reverse Scan Conversion Unit]

The reverse scan conversion unit 1106 in the decoder will be described. More specifically, the reverse scan conversion unit 1106 in the embodiment parallelly performs reverse scan conversion for a plurality of blocks to restore one-dimensional array data of one block into a two-dimensional array. Data to undergo reverse scan conversion are the transform coefficients of a block that are obtained by entropy-decoding an encoded bit stream (see FIG. 2B). The scan order is updated for each block, and the scan order and additional information accompanying the update of the scan order are causally determined.

The arrangement and processing contents of the reverse scan conversion unit 1106 according to the first embodiment will be explained with reference to FIG. 16. For descriptive convenience, reverse scan conversion is done simultaneously for two blocks.

The reverse scan conversion unit 1106 receives the same pairs of blocks as those for the scan conversion unit 206 in the order of blocks (A,B)→(C,D)→(E,F)→(G,H)→(I,J)→(K,L)→(M,N)→(O,P) in FIG. 4. Also in this case, a block corresponding to X of the pair (X,Y) will be called "block X", and one corresponding to Y will be called "block Y".

Figure 16:
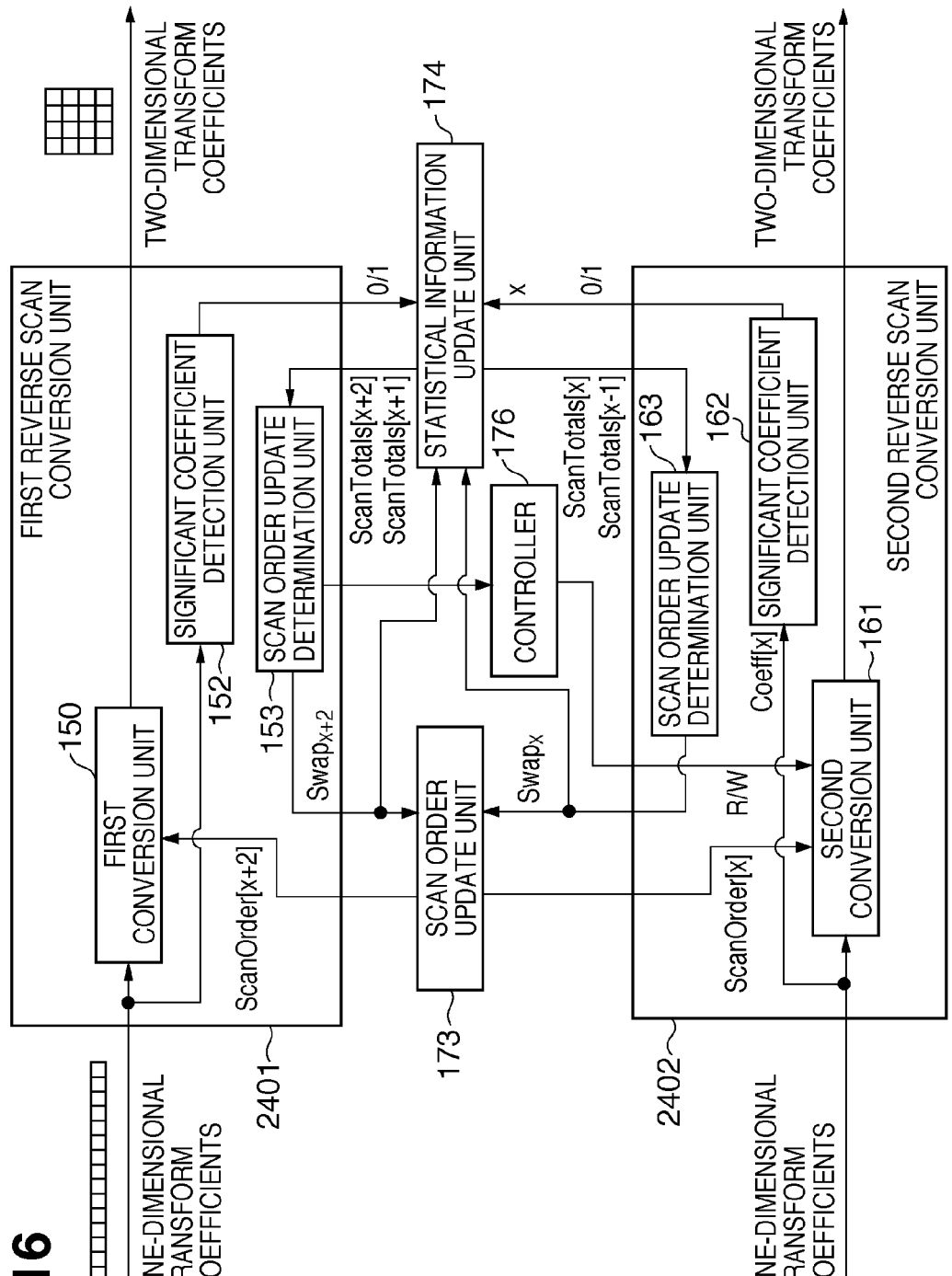
FIG. 16 is a block diagram of the arrangement of a reverse scan conversion unit in the first embodiment.

The reverse scan conversion unit 1106 in the embodiment includes a first reverse scan conversion unit 2401 and second reverse scan conversion unit 2402, as shown in FIG. 16, in order to parallelly convert data of two blocks into two-dimensional arrays. Further, the reverse scan conversion unit 1106 includes a scan order update unit 173 and statistical information update unit 174 which are shared between the two reverse scan conversion units, and a controller 176 which controls the processing start timing of the second reverse scan conversion unit 2402. The first reverse scan conversion unit 2401 includes a first conversion unit 150, significant coefficient detection unit 152, and scan order update determination unit 153. The second reverse scan conversion unit 2402 includes a second conversion unit 161, significant coefficient detection unit 162, and scan order update determination unit 163.

As shown in FIG. 16, the reverse scan conversion unit 1106 has almost the same arrangement as that of the scan conversion unit 206. However, the meaning of ScanOrder[ ] stored and held in the scan order update unit 173 is opposite to that in the scan order update unit 103. For example, the scan order update unit 173 stores and holds, as ScanOrder[1], information for arranging the first transform coefficient of an input one-dimensional array at a pixel position "d" (see FIG. 4) in the two-dimensional array of block X. This also applies to ScanOrder[2] and subsequent ones.

Note that data stored in the statistical information update unit 174 suffice to be the same as that in the statistical information update unit 104 of the scan conversion unit 206. Processing by the reverse scan conversion unit 1106 in the embodiment is almost the same as that by the scan conversion unit 206 in the encoder. More specifically, when the first reverse scan conversion unit 2401 arranges the input third transform coefficient in block X serving as a two-dimensional array, the second reverse scan conversion unit 2402 starts processing of arranging the input first transform coefficient in block Y serving as a two-dimensional array. The second reverse scan conversion unit 2402 proceeds the processing in a scan order finalized by the first reverse scan conversion unit 2401. The first conversion unit 150 and second conversion unit 161 incorporate memories each for storing 15 transform coefficients. Upon completion of storing (reversely scanning) the transform coefficients of one block, the conversion unit outputs them in a preset order, e.g., an order in FIG. 3D or 3E.

In the above example, the parallel processing count of reverse scan conversion is "2", but can also be further increased for the same reason as that of the scan conversion unit 206 on the encoding side. When the number of transform coefficients to be converted into a two-dimensional array is N, the maximum parallel processing count in reverse scan conversion is "N/2".

In the embodiment, position information ScanOrder indicating a scan position, and statistical information ScanTotals are separately stored and managed, but may be stored and managed in one memory because ScanOrder[i] and statistical information ScanTotals[i] are always handled as a pair. More specifically, each pair is defined as sorted information Inf[i], and stored and managed as Inf[i]={ScanOrder[i], ScanTotals[i]} (i=1, 2, . . . , N). When data need to be swapped, data held in Inf[i−1] and Inf[i] are swapped. The resultant data can be regarded to be equivalent to those described above.

Second Embodiment

Figure 9:
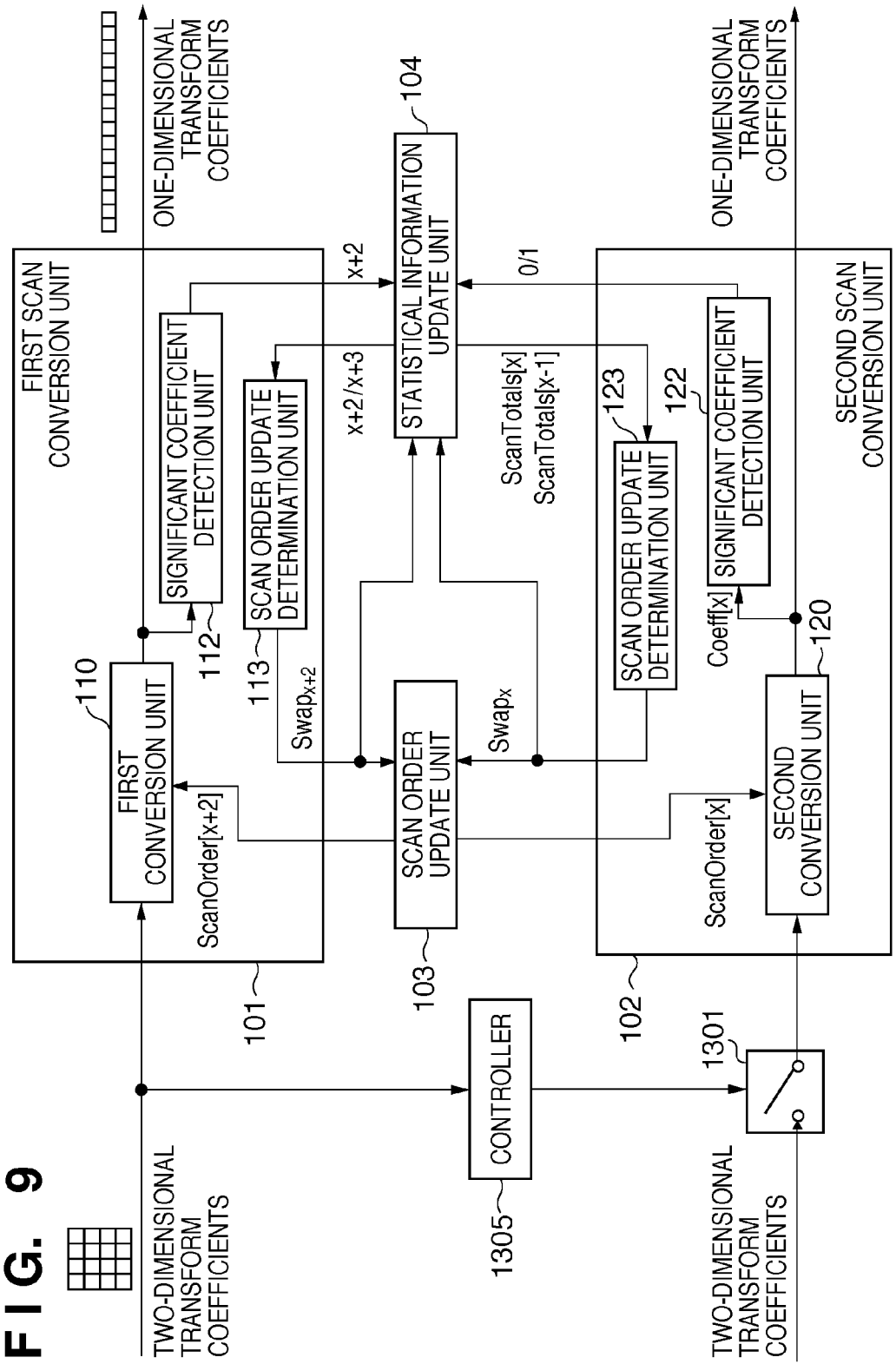
FIG. 9 is a block diagram of the arrangement of a scan conversion unit in the second embodiment.

The arrangement and processing of a scan conversion unit 206 according to the second embodiment will be described with reference to FIG. 9. Also in the second embodiment, the parallel count in scan conversion processing is "2". Unlike FIG. 1, the controller 105 is omitted, and a controller 1305 and switch 1301 are added instead. The remaining arrangement is the same as that in FIG. 1. The same reference numerals as those in FIG. 1 denote the same functions, and a description thereof will not be repeated.

In the second embodiment, the controller 1305 controls the switch 1301 to delay the input timing of a transform coefficient supplied to a second scan conversion unit 102 from that to a first scan conversion unit 101 by two transform coefficients. Hence, processing by the remaining arrangement is the same as that by the scan conversion unit 206 in the first embodiment. It will be easily understood from the description of the first embodiment that even a reverse scan conversion unit 1106 has almost the same arrangement as that in FIG. 9.

Third Embodiment

In the first and second embodiments, one of two scan conversion units starts scan conversion with a delay of two transform coefficients from the other. The third embodiment will describe an example with reference to FIG. 12 in which no time difference is posed between conversion processes by two scan conversion units, and instead, the output timing of one scan conversion unit is controlled.

A scan conversion unit 206 according to the third embodiment includes a first scan conversion unit 401, second scan conversion unit 402, statistical information update unit 403, and scan order update unit 404. The statistical information update unit 403 totals, stores, and holds a significant coefficient generation frequency corresponding to the scan order from data output from the first scan conversion unit 401. The scan order update unit 404 updates the scan order based on data output from the significant coefficient detection units of the first and second scan conversion units 401 and 402, and statistical information of the statistical information update unit 403. The scan order update unit 404 stores and holds the updated scan order, and also sends a scan order update signal to the statistical information update unit 403.

A first conversion unit 110 and significant coefficient detection unit 112 of the first scan conversion unit 401, and a second conversion unit 120 and significant coefficient detection unit 122 of the second scan conversion unit 402 have the same functions as those in the first embodiment, and a description thereof will not be repeated. The second scan conversion unit 402 further includes a conversion unit 421 made up of a holding unit 411 and selection unit 412, and a first determination unit 420.

The first conversion unit 110 in the first scan conversion unit 401 sorts the transform coefficients of input block X into a one-dimensional array in accordance with scan order information ScanOrder[ ] input from the scan order update unit 404, and outputs the sorted transform coefficients. At this time, the significant coefficient detection unit 112 determines whether the transform coefficient having undergone scan conversion is a significant coefficient, and outputs the detection result as a signal S1.

Also, the second conversion unit 120 in the second scan conversion unit 402 sorts the transform coefficients of input block Y into a one-dimensional array in accordance with scan order information ScanOrder[ ] input from the scan order update unit 404, and outputs the sorted transform coefficients. However, the order of transform coefficients output from the second conversion unit 120 may not be correct. Thus, the first determination unit 420 and conversion unit 421 of the second scan conversion unit 402 determine whether to output, directly in the output order, a transform coefficient C[x] output from the second conversion unit 120 and a transform coefficient C[x−1] output immediately before C[x]. That is, the first determination unit 420 and conversion unit 421 determine which of C[x−1] and C[x] is to be output first.

Figure 12:
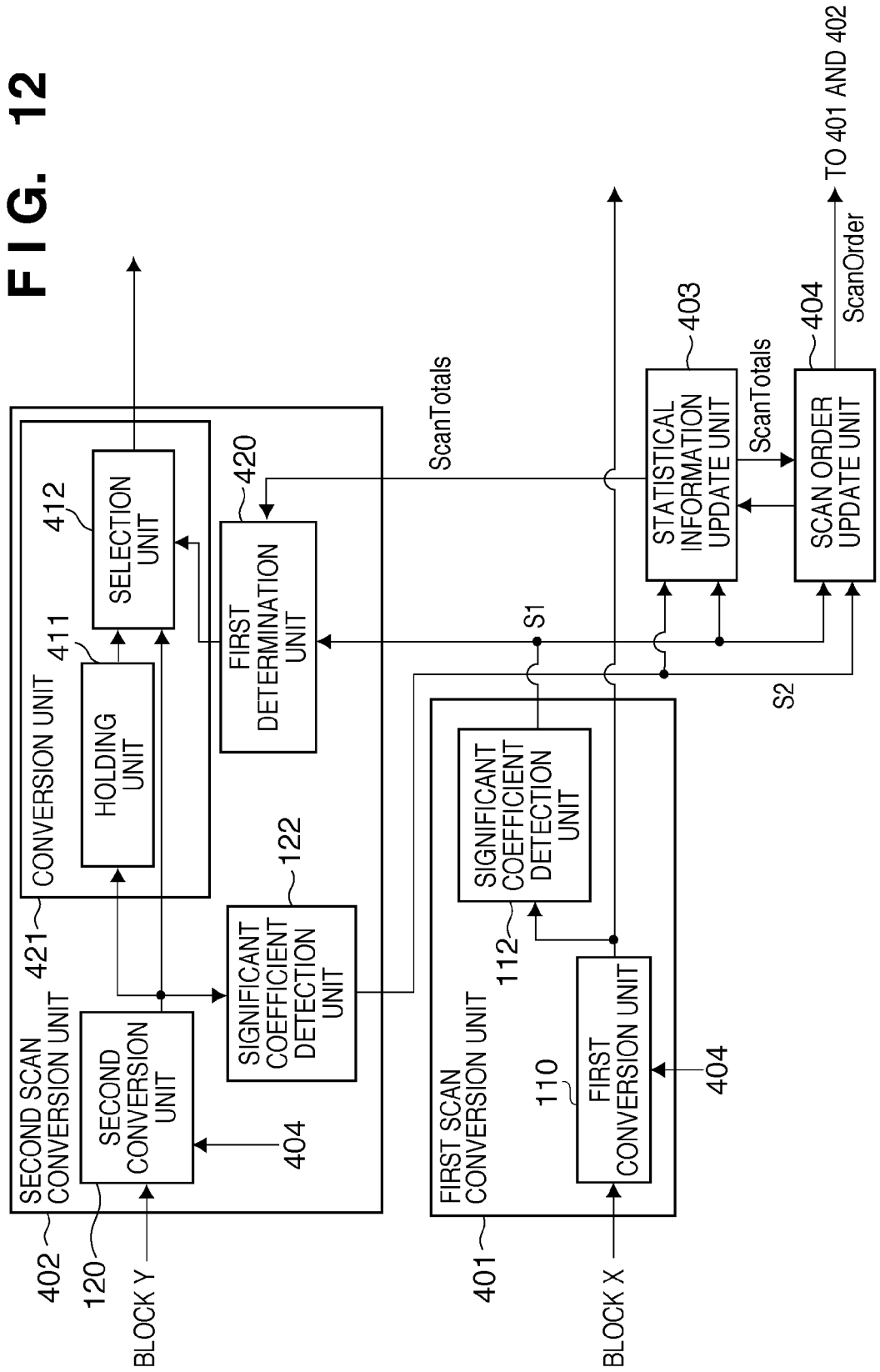
FIG. 12 is a block diagram of the arrangement of a scan conversion unit in the third embodiment.

Processing by the scan conversion unit 206 in FIG. 12 will be explained. Also in the third embodiment, a pair of two blocks to be parallelly processed is defined as blocks (X,Y), and the input order is assumed to be the same as that in the first embodiment. In the following description, #n (n=1, 2, ..., 15) is the timing to scan the nth transform coefficient.

The first scan conversion unit 401 receives block X, and the second scan conversion unit 402 receives block Y. Each conversion unit sorts the transform coefficients in accordance with scan order information ScanOrder[ ] from the scan order update unit 404. Assume that the scan order information ScanOrder[ ] held in the scan order update unit 404 is one as shown in FIG. 7B. At timing #1, the first conversion unit 110 of the first scan conversion unit 401 reads and outputs a transform coefficient "d" indicated by ScanOrder[1] in block X. At timing #1, the second conversion unit 120 of the second scan conversion unit 402 also reads and outputs a transform coefficient "d" indicated by ScanOrder[1] in block Y. At this stage, the selected transform coefficient "d" is not output from the second scan conversion unit 402 and is held in the holding unit 411.

At the next timing #2, the first conversion unit 110 of the first scan conversion unit 401 reads and outputs a transform coefficient "a" indicated by ScanOrder[2] in block X. At timing #2, the second conversion unit 120 of the second scan conversion unit 402 also reads and outputs a transform coefficient "a" in block Y.

Assume that the transform coefficient "a" output from the first scan conversion unit 401 at timing #2 is an insignificant coefficient. In this case, the signal S1 becomes "0". The first determination unit 420 has already read ScanTotals[1] at timing #1. Since no transform coefficient exists before timing #1, the holding unit 411 is regarded to neither store nor hold a transform coefficient. At timing #2, ScanTotals[2] is read, but the statistical information update unit 403 does not update (increment) ScanTotals[2] because the signal S1 is "0". When the first scan conversion unit 401 has completed scan processing for block X at timing #2, the first determination unit 420 can determine that at least the relation "ScanTotals[1]≧ScanTotals[2]" is maintained. The first determination unit 420 therefore outputs, to the selection unit 412, a signal representing that swapping is unnecessary (sorting is unnecessary). Upon receiving this signal, the selection unit 412 selects and outputs the transform coefficient "d" held by the holding unit 411. After outputting the transform coefficient "d", the holding unit 411 stores the transform coefficient "a".

In contrast, assume that the transform coefficient "a" output from the first scan conversion unit 401 at timing #2 is a significant coefficient, i.e., the signal S1 is "1". At this time, the first determination unit determines whether "ScanTotals[1]≧ScanTotals[2]+1" is satisfied. If this relation is satisfied, the first determination unit 420 outputs, to the selection unit 412, a signal representing that swapping is unnecessary (sorting is unnecessary). Upon receiving this signal, the selection unit 412 selects and outputs the transform coefficient "d" held by the holding unit 411. The holding unit 411 then newly stores the transform coefficient "a".

If the signal S1 becomes "1" at timing #2 and as a result, it is determined that "ScanTotals[1]<ScanTotals[2]+1" is satisfied, the first determination unit 420 outputs, to the selection unit 412, a signal representing that swapping is necessary (sorting is necessary). Upon receiving this signal, the selection unit 412 outputs the transform coefficient "a" output from the second conversion unit 120 at timing #2. At this time, the holding unit 411 holds the transform coefficient "d" in preparation for the next timing #3.

In this fashion, even while the two scan conversion units perform sorting for blocks X and Y in accordance with the same scan order information ScanOrder[ ], the second scan conversion unit 402 can execute sorting complying with the update result of statistical information ScanTotals[ ] of the first scan conversion unit 401.

Figure 14:
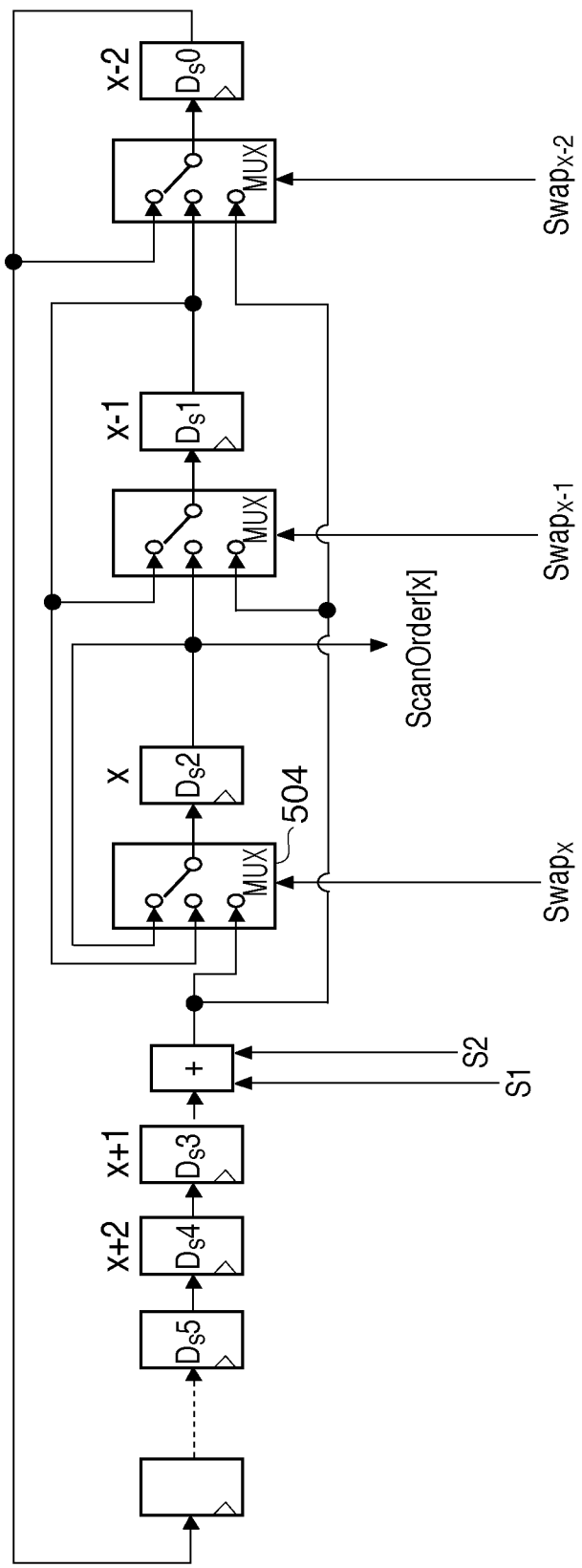
FIG. 14 is a circuit diagram of the arrangement of a statistical information update unit in the third embodiment.

The statistical information update unit 403 in the third embodiment will be described. Every time a significant coefficient is generated, the statistical information update unit 403 updates statistical information in correspondence with the ID of the transform coefficient. If significant coefficients are generated for the same ID in the two blocks X and Y, the statistical information update unit 403 adds "2" to a statistical information value ScanTotals[ ] corresponding to the ID. If a significant coefficient is generated for the target ID in either block X or Y, the statistical information update unit 403 adds "1" to statistical information ScanTotals[ ] corresponding to the ID. Further, if no significant coefficient is generated for the target ID in both blocks X and Y (the transform coefficient is a run), the statistical information update unit 403 does not update statistical information. Note that a ring buffer as shown in FIG. 14 used to update the ID can reduce the calculation resource, and statistical information can be sequentially output to the first determination unit. At this time, the addition value of statistical information is determined from the detection result S1 of the significant coefficient detection unit that corresponds to the target ID in block X, and the detection result S2 of the significant coefficient detection unit that corresponds to the target ID in block Y.

Figure 13:
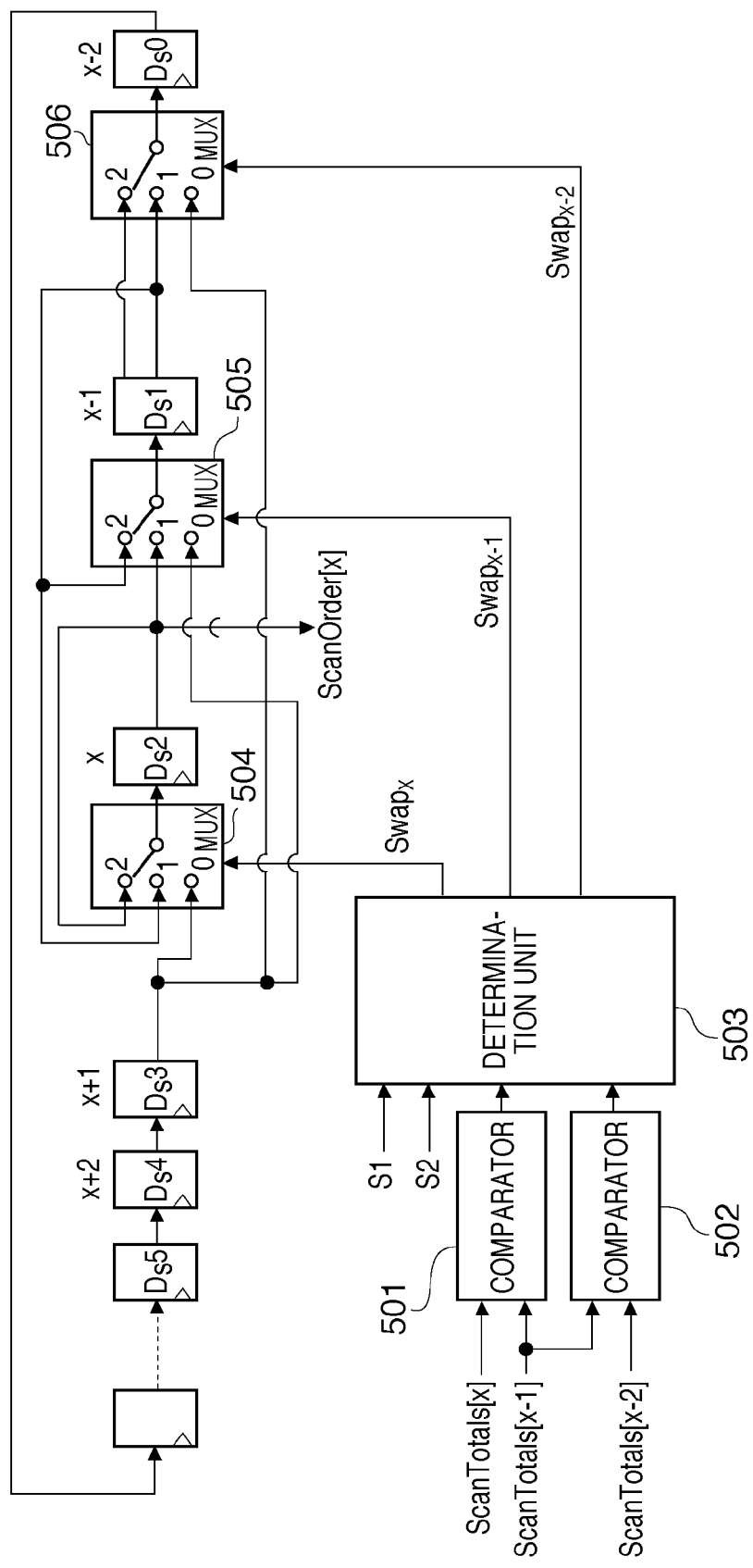
FIG. 13 is a circuit diagram of the arrangement of a scan order update unit in the third embodiment.

Next, the scan order update unit 404 will be described. The scan order update unit 404 updates the scan order ScanOrder [ ] based on three statistical information values from the statistical information update unit 403, and the detection results S1 and S2 of the significant coefficient detection units 112 and 122. FIG. 13 exemplifies the arrangement of the scan order update unit 404. The scan order update unit 404 includes two comparators 501 and 502, a determination unit 503, a scan order storage buffer, and selectors 504, 505, and 506 for updating the scan order. A ring buffer as shown in FIG. 13 used as the scan order storage buffer can reduce the circuit configuration resource. In addition, an output from a fixed latch can be output as an output data address in scan conversion. The comparator 501 compares two pieces of statistical information input from the statistical information update unit 403, and outputs the comparison result. This comparison result is defined as CMP1. The comparator 501 compares statistical information ScanTotals[x] corresponding to the target ID with immediately preceding statistical information ScanTotals[x−1], and outputs the comparison result. For example, when ScanTotals[x] and ScanTotals[x−1] are equal to each other, the comparator 501 outputs "1". If the ScanTotals[x] is smaller than ScanTotals[x−1], the comparator 501 outputs "0". If the ScanTotals[x] is larger than ScanTotals[x−1], the comparator 501 outputs "2". It is desirable to represent output data with the minimum number of bits. However, the bit representation of the comparison result is not directed to the present invention. Similarly, the other comparator 502 compares the statistical information value ScanTotals[x−1] immediately preceding by one for the target ID with a statistical information value ScanTotals[x−2] preceding by two. This comparison result is defined as CMP2. As shown in FIG. 15, a scan order swapping operation is uniquely determined from the significant coefficient detection signals S1 and S2 and the comparison results CMP1 and CMP2. For example, for S1=1, S2=1, CMP1=1, and CMP2=1 or 2, both coefficients corresponding to the target ID in blocks X and Y are significant coefficients, and the descending order of statistical information values is lost (ScanTotals[x]==ScanTotals[x−1], ScanTotals[x−1]≧ScanTotals[x−2]). For this reason, the scan order is updated in response to generation of a significant coefficient, and the scan turn for the target ID is advanced by two. In this manner, the scan order swapping operation is uniquely determined from the significant coefficient detection signals S1 and S2 and the comparison results CMP1 and CMP2. In FIG. 15, "!0" means "nonzero".

To put it more plainly, when the xth transform coefficient undergoes scan processing to update ScanTotals[x], attention is paid to ScanTotals[x−1] and ScanTotals[x], and if "ScanTotals[x−1] ScanTotals[x]", swapping processing ends. If "ScanTotals[x−1]<ScanTotals[x]", ScanTotals[x−1] and ScanTotals[x], and ScanOrder[x−1] and ScanOrder[x] are swapped respectively. After that, attention is given to ScanTotals[x−2] and ScanTotals[x−1], and the same processing is executed.

Assuming that the parallel count in the third embodiment is M in a general format, it suffices to execute the following processing.

First, priority levels are assigned to M scan conversion units as the first to Mth scan conversion units. Each scan conversion unit suffices to include a holding unit (corresponding to the holding unit 411) which holds data sorted at a timing immediately before sorting the ith data, a counting unit which counts the number L of scan conversion units that have output information indicating that the ith data is significant data, out of scan conversion units higher in priority level than the scan conversion unit (in the third embodiment, the parallel count is "2", only the first scan conversion unit is higher in priority level than the second scan conversion unit, and thus it suffices to simply determine whether S1 is "0" or "1"), a determination unit (corresponding to the first determination unit 420) which determines whether the relation "ScanTotals[i−1] ScanTotals[i]+L" is satisfied, and a selection unit (corresponding to the selection unit 412) which, when the determination result of the determination unit represents that the relation "ScanTotals[i−1]≧ ScanTotals[i]+L" is satisfied, outputs data held by the holding unit and then holds currently sorted data in the holding unit, and when the determination result of the determination unit represents "ScanTotals[i−1]<ScanTotals[i]+L", outputs currently sorted data and then outputs data held by the holding unit.

With this arrangement, according to the third embodiment, M (2≦M) scan conversion units can parallelly execute processing.

The foregoing arrangements of the statistical information update unit 403 and scan order update unit 404 are merely examples, and are not limited to the present invention. The embodiments have been described on the premise of scan conversion. In reverse scan conversion, input data of the significant coefficient detection unit is that of the conversion unit. Processes by the remaining processing units are the same as those in scan conversion, and a description thereof will not be repeated.

As described above, according to the third embodiment, scan conversion can be simultaneously executed for a plurality of blocks having different scan orders by controlling the output timing regardless of the input timing.

The embodiments have exemplified an application to a digital camera, but the present invention is not limited to the digital camera. Further, the encoder 1211 may be arranged as a single image encoding apparatus.

In the embodiments, one block has a 4×4 size. However, this is merely an example, and the present invention is generally applicable to an n×m array.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-118045, filed May 14, 2009, which is hereby incorporated by reference herein in its entirety.

What is claimed is:

1. A scan conversion apparatus which scans a block formed from N data of a two-dimensional array and sorts the data into one-dimensional array data, the apparatus comprising:
   a holding unit which holds scan order information which is determined based on an appearance frequency of significant data at each position in a block scanned in the past and indicates a scan order in the block;
   a first scan conversion unit which scans N data which form a first block, in an order indicated by the scan order information, and outputs the N data as one-dimensional array data;
   an update unit which, when data at a position A in a block is significant data during scanning by said first scan conversion unit, updates an appearance frequency corresponding to the position A;
   a swapping unit which, when an appearance frequency (of significant data) at a position B (in the block) corresponding to a scan turn immediately before the position A is smaller than the appearance frequency (of significant data) at the position A after update by said update unit, swaps the scan orders of the position A and position B that are indicated by the scan order information; and
   a second scan conversion unit which reads out N data which form a second block following the first block, in an order indicated by the scan order information, and outputs the N data as one-dimensional array data,
   wherein said second scan conversion unit starts scanning the second block before completion of scanning the first block by said first scan conversion unit, and
   when said first scan conversion unit scans I-th data of the first block, said second scan conversion unit scans (I-K)th (K is at least 2) data of the second block at earliest in order to reflect a swapping result by said swapping unit along with scanning of the first block by said first scan conversion unit.

2. A method of controlling a scan conversion apparatus which scans a block formed from N data of a two-dimensional array and sorts the data into one-dimensional array data, the method comprising:
   a holding step of holding scan order information which is determined based on an appearance frequency of significant data at each position in a block scanned in the past and indicates a scan order in the block;
   a first scan conversion step of scanning N data which form a first block, in an order indicated by the scan order information, and outputting the N data as one-dimensional array data;
   an update step of, when data at a position A in a block is significant data during scanning in the first scan conversion step, updating an appearance frequency corresponding to the position A;
   a swapping step of, when an appearance frequency (of significant data) at a position B (in the block) corresponding to a scan turn immediately before the position A is smaller than the appearance frequency (of significant data) at the position A after update in the update step, swapping the scan orders of the position A and position B that are indicated by the scan order information; and
   a second scan conversion step of reading out N data which form a second block following the first block, in an order indicated by the scan order information, and outputting the N data as one-dimensional array data,
   wherein in the second scan conversion step, scanning of the second block starts before completion of scanning the first block in the first scan conversion step, and
   when I-th data of the first block is scanned in the first scan conversion step, (I-K)th (K is at least 2) data of the second block is scanned at earliest (in the second scan conversion step) in order to reflect a swapping result in the swapping step along with scanning of the first block in the first scan conversion step.

3. A scan conversion apparatus which scans a block formed from N data of a two-dimensional array and sorts the data into one-dimensional array data so as to collect significant data first and then collect insignificant data after the significant data, the apparatus comprising:
   a setting unit which pairs position information indicating a position of each data in the block and statistical information indicating an appearance frequency of significant data at the position of each data, and sets sorted information by sorting pieces of statistical information in a descending order;
   M ($2 \leq M \leq N/2$) scan conversion units, each of which reads out N data which form a supplied block, in an order based on the position information in the sorted information, outputs the N data as one-dimensional array data, and outputs information indicating whether readout data is significant data, said M scan conversion units being capable of parallelly running;
   a statistical information update unit which, when one of said M scan conversion units outputs information indicating that ith data is significant data, updates statistical information corresponding to a position of the ith data;
   a swapping unit which, when a relationship between statistical information to be updated and immediately preceding statistical information becomes an ascending order relationship as a result of update by said statistical information update unit, swaps two pieces of sorted information containing the pieces of statistical information having the ascending order relationship; and
   a control unit which assigns priority levels to said M scan conversion units as first to Mth scan conversion units, and causing causes each scan conversion unit to start scanning data at a timing delayed by at least two data from scan conversion unit higher in priority level by one than said each scan conversion unit.

4. An image encoding apparatus which encodes image data, the apparatus comprising:

an image division unit which divides an image into blocks each formed from n rows and m columns;

an orthogonal transform unit which performs an orthogonal transform for each block output from said image division unit, and outputs transform coefficients;

a scan conversion apparatus defined in claim 1 which parallelly sorts transform coefficients of M blocks output from said orthogonal transform unit; and an entropy encoding unit which entropyencodes the transform coefficients of the M blocks output from said scan conversion apparatus, and outputs an encoded stream.

5. A scan conversion apparatus which scans a block formed from N data of a two-dimensional array and sorts the data into one-dimensional array data so as to collect significant data first and then collect insignificant data after the significant data, the apparatus comprising:

a setting unit which pairs position information indicating a position of each data in the block and statistical information indicating an appearance frequency of significant data at the position of each data, and sets sorted information by sorting pieces of statistical information in a descending order;

M ($2 \leq M$) scan conversion units, each of which reads out N data which form a supplied block, in an order based on the position information in the sorted information, outputs the N data as one-dimensional array data, and outputs information indicating whether readout data is significant data, said M scan conversion units being capable of parallelly running;

a statistical information update unit which, when said M scan conversion units parallelly sorts ith data, updates statistical information corresponding to a position of the ith data in accordance with the number of scan conversion units that have output information indicating that the ith data is significant data; and a swapping unit which, when a relationship between statistical information to be updated and immediately preceding statistical information becomes an ascending order relationship as a result of update by said statistical information update unit, swaps two pieces of sorted information containing the pieces of statistical information having the ascending order relationship, wherein priority levels are assigned to said M scan conversion units as first to Mth scan conversion units, and each scan conversion unit includes a holding unit which holds data sorted at a timing immediately before sorting ith data, a determination unit which determines whether a relation "ScanTotals[i−1]$\geq$ScanTotals[i]+L" is satisfied, where L is the number of scan conversion units which have output information indicating that the ith data is significant data and are higher in priority level than said each scan conversion unit, and ScanTotals[i] is ith statistical information, and a selection unit which, when a determination result of said determination unit represents that the relation "ScanTotals[i−1]$\geq$ScanTotals[i]+L" is satisfied, outputs data held by said holding unit and then holds currently sorted data in said holding unit, and when the determination result of said determination unit represents "ScanTotals[i−1]<ScanTotals[i]+L", outputs currently sorted data.

6. An image encoding apparatus which encodes image data, the apparatus comprising:

an image division unit which divides an image into blocks each formed from n rows and m columns;

an orthogonal transform unit which performs orthogonal transform for each block output from said image division unit, and outputs transform coefficients;

a scan conversion apparatus defined in claim 5 which parallelly sorts transform coefficients of M blocks output from said orthogonal transform unit; and an entropy encoding unit which entropy-encodes the transform coefficients of the M blocks output from said scan conversion apparatus, and outputs an encoded stream.

7. A method of controlling a scan conversion apparatus which parallelly sorts M blocks each formed from N data of a two-dimensional array into one-dimensional array data so as to collect significant data first and then collect insignificant data after the significant data, the method comprising:

a setting step of pairing position information indicating a position of each data in the block and statistical information indicating an appearance frequency of significant data at the position of each data, and setting sorted information by sorting pieces of statistical information in a descending order;

M ($2 \leq M \leq N/2$) scan conversion steps each of reading out N data which form the block, in an order based on the position information in the sorted information, outputting the N data as one-dimensional array data, and outputting information indicating whether readout data is significant data, the M scan conversion steps being capable of parallelly running;

a statistical information update step of, when information indicating that ith data is significant data is output in one of the M scan conversion steps, updating statistical information corresponding to a position of the ith data;

a swapping step of, when a relationship between statistical information to be updated and immediately preceding statistical information becomes an ascending order relationship as a result of update in the statistical information update step, swapping two pieces of sorted information containing the pieces of statistical information having the ascending order relationship; and a control step of assigning priority levels to the M scan conversion steps as first to Mth scan conversion steps, and starting scanning data in each scan conversion step at a timing delayed by at least two data from a scan conversion step higher in priority level by one than each scan conversion step.

8. A method of controlling an image encoding apparatus which encodes image data, the method comprising:

an image division step of dividing an image into blocks each formed from n rows and m columns;

an orthogonal transform step of performing orthogonal transform for each block output in the image division step, and outputting transform coefficients;

a processing step of performing steps defined in the method according to claim 2 which parallelly sorts the transform coefficients of M blocks output in the orthogonal transform step; and an entropy encoding step of entropy-encoding the transform coefficients of the M blocks output from the scan conversion apparatus, and outputting an encoded stream.

9. A method of controlling a scan conversion apparatus which parallelly sorts M blocks each formed from N data of a two-dimensional array into one-dimensional array data so as to collect significant data first and then collect insignificant data after the significant data, the method comprising:

a setting step of pairing position information indicating a position of each data in the block and statistical information indicating an appearance frequency of significant data at the position of each data, and setting sorted information by sorting pieces of statistical information in a descending order;

M ($2 \leqq M$) scan conversion steps each of reading out N data which form the block, in an order based on the position information in the sorted information, outputting the N data as one-dimensional array data, and outputting information indicating whether readout data is significant data, the M scan conversion steps being capable of parallelly running;

a statistical information update step of, when ith data are parallelly sorted in the M scan conversion steps, updating statistical information corresponding to a position of the ith data in accordance with the number of scan conversion steps in which information indicating that the ith data is significant data have been output; and a swapping step of, when a relationship between statistical information to be updated and immediately preceding statistical information is an ascending order relationship as a result of update in the statistical information update step, swapping two pieces of sorted information containing the pieces of statistical information having the ascending order relationship, wherein priority levels are assigned to the M scan conversion steps as first to Mth scan conversion steps, and each scan conversion step includes a holding step of holding data sorted at a timing immediately before sorting ith data, a determination step of determining whether a relation "ScanTotals[i−1]$\geqq$ScanTotals[i]+L" is satisfied, where L is the number of scan conversion steps in which information indicating that the ith data is significant data have been output and which are higher in priority level than each scan conversion step, and ScanTotals[i] is ith statistical information, and a selection step of, when a determination result in the determination step represents that the relation "ScanTotals[i−1]$\geqq$ScanTotals[i]+L" is satisfied, outputting data held in the holding step and then holding currently sorted data in the holding step, and when the determination result in the determination step represents "ScanTotals[i−1]<ScanTotals[i]+L", outputting currently sorted data.

10. A method of controlling an image encoding apparatus which encodes image data, the method comprising:

an image division step of dividing an image into blocks each formed from n rows and m columns;

an orthogonal transform step of performing orthogonal transform for each block output in the image division step, and outputting transform coefficients;

a processing step of defined in the method according to claim 6 which parallelly sorts the transform coefficients of M blocks output in the orthogonal transform step; and an entropy encoding step of entropy-encoding the transform coefficients of the M blocks output from the scan conversion apparatus, and outputting an encoded stream.

* * * * *